(12) United States Patent
Tandekar et al.

(10) Patent No.: US 12,696,135 B2
(45) Date of Patent: Jul. 28, 2026

(54) TRAFFIC BALANCING FOR MOVING USERS, PROACTIVE SLICE MANAGEMENT, AND PREDICTIVE SLICE MANAGEMENT USING ARTIFICIAL INTELLIGENCE

(71) Applicant: Boost SubscriberCo L.L.C., Englewood, CO (US)

(72) Inventors: Dilip Tandekar, Herndon, VA (US); Gurpreet Sohi, Parker, CO (US); Sourabh Gupta, Ashburn, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 156 days.

(21) Appl. No.: 18/602,490

(22) Filed: Mar. 12, 2024

(65) Prior Publication Data

US 2025/0294406 A1     Sep. 18, 2025

(51) Int. Cl.
| | |
|---|---|
| *G06F 15/173* | (2006.01) |
| *H04W 28/02* | (2009.01) |
| *H04W 28/08* | (2023.01) |
| *H04W 28/086* | (2023.01) |

(52) U.S. Cl.
CPC ... *H04W 28/0861* (2023.05); *H04W 28/0268* (2013.01); *H04W 28/0942* (2020.05)

(58) Field of Classification Search
None
See application file for complete search history.

(56) References Cited

U.S. PATENT DOCUMENTS

| | | | |
|---|---|---|---|
| 2023/0209390 A1* | 6/2023 | Zeng ..................... | H04W 24/02 |
| 2024/0259879 A1* | 8/2024 | Ranganath ........... | H04W 28/18 |

OTHER PUBLICATIONS

Sridhar Bhaskaran, "How does 5G's O-RAN E2 Interface Work?" available at https://www.5gtechnologyworld.com/how-does-5gs-o-ran-e2-interface-work/ (Apr. 11, 2023).

* cited by examiner

*Primary Examiner* — Umar Cheema
*Assistant Examiner* — Andrew Woo
(74) *Attorney, Agent, or Firm* — Kilpatrick Townsend & Stockton LLP

(57) ABSTRACT

Traffic balancing for moving users, proactive slice management, and predictive slice management using Artificial Intelligence (AI) are disclosed. Radio Access Networks (RANs) are adjusted based on predicted data usage for moving users based on the applications they are running using AI/machine learning (ML) models. Load balancing is performed when new users move into a coverage area. Predictive slice management is performed to allocate bandwidth to users for a period of time based on predicted application usage.

18 Claims, 16 Drawing Sheets

300

600

700

800

802

810    820    830    840    850

900

1100

1200

START

Collect Training Information and Store in Data Lake — 1210

Train AI/ML Model(s) — 1220

Deploy Trained AI/ML Model(s) — 1230

Receive Information from Base Stations of RAN — 1240

Determine that Slice(s) should be Configured — 1250

Send Control Instructions to Base Station(s) — 1260

Continue to Collect and Store Information — 1270

1300

1400

START

Retrieve Training Data from Data Lake — 1410

Train AI/ML Model(s) — 1420

Deploy Trained AI/ML Model(s) — 1430

Monitor RAN — 1440

Determine Predictive Slice Management should be Performed — 1450

Configure and Allocate Slice(s) — 1460

Continue to Collect and Store Information — 1470

TRAFFIC BALANCING FOR MOVING USERS, PROACTIVE SLICE MANAGEMENT, AND PREDICTIVE SLICE MANAGEMENT USING ARTIFICIAL INTELLIGENCE

FIELD

The present invention generally relates to communications, and more specifically, to traffic balancing for moving users, proactive slice management, and predictive slice management using artificial intelligence (AI).

BACKGROUND

The user experience for mobile device users can suffer while they are moving. For instance, if a user is handed over from one base station to another, the same Quality of Service (QOS) may not be maintained. Different regions also have different spectrum availability, and network performance characteristics may change due to congestion, software issues, and/or carrier hardware failure, for example. Accordingly, an improved and/or alternative approach may be beneficial.

SUMMARY

Certain embodiments of the present invention may provide solutions to the problems and needs in the art that have not yet been fully identified, appreciated, or solved by current communications technologies, and/or provide a useful alternative thereto. For example, some embodiments of the present invention pertain to traffic balancing for moving users, proactive slice management, and predictive slice management using AI.

In an embodiment, one or more computing systems include memory storing computer program instructions and at least one processor configured to execute the computer program instructions. The computer program instructions are configured to cause the at least one processor to receive traffic information from base stations of a Radio Access Network (RAN). The computer program instructions are also configured to cause the at least one processor to determine, by a RAN Intelligent Controller (RIC) that uses one or more Artificial Intelligence (AI)/Machine Learning (ML) models, based on the received traffic information that one or more network slices for a mobile device should be configured. The computer program instructions are further configured to cause the at least one processor to send, by the RIC, control instructions to at least one base station of the one or more base stations to configure the one or more network slices for the mobile device.

In another embodiment, one or more non-transitory computer-readable media store one or more computer programs. The one or more computer programs are configured to cause at least one processor to receive, by a Near-Real Time (NT) RIC that uses one or more AI/ML models, traffic information from base stations of a RAN. The one or more computer programs are also configured to cause the at least one processor to determine, by the RT RIC and the AI/ML models, based on the received traffic information that one or more network slices for a mobile device should be configured. The one or more computer programs are further configured to cause the at least one processor to send, by the RT RIC, control instructions to at least one base station of the one or more base stations to configure the one or more network slices for the mobile device.

In yet another embodiment, a computer-implemented method includes receiving, by an xApp of a NT RIC that uses one or more AI/ML models, traffic information from base stations of a RAN. The computer-implemented method also includes determining, by the xApp of the RT RIC and the AI/ML models, based on the received traffic information that one or more network slices for a mobile device should be configured by at least one of assigning bit rates, assigning one or more bands, assigning one or more cell sites, and setting up Carrier Aggregation (CA) for the mobile device. The computer-implemented method further includes sending, by the xApp of the RT RIC, control instructions to at least one base station of the one or more base stations to configure the one or more network slices for the mobile device to provide at least one of guaranteed downlink throughput, guaranteed uplink throughput, guaranteed maximum latency.

In still another embodiment, a computer-implemented method includes monitoring, by a RIC, network availability information and load information from a RAN. The computer-implemented method also includes determining, by the RIC using one or more AI/ML models, that proactive load balancing should be performed for the RAN. The computer-implemented method further includes sending, by the RIC, control instructions to one or more base stations of the RAN to perform the proactive load balancing.

In another embodiment, one or more computing systems include memory storing computer program instructions and at least one processor configured to execute the stored computer program instructions. The computer program instructions are configured to cause the at least one processor to monitor, by a RIC, a RAN using one or more AI/ML models. The computer program instructions are also configured to cause the at least one processor to determine, by the RIC using the one or more AI/ML models, that predictive slice management should be performed based on predicted application usage on a UE device. The computer program instructions are further configured to cause the at least one processor to configure and allocate, by the RIC, one or more slices to the UE device based on the predicted application usage.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Figure 1:
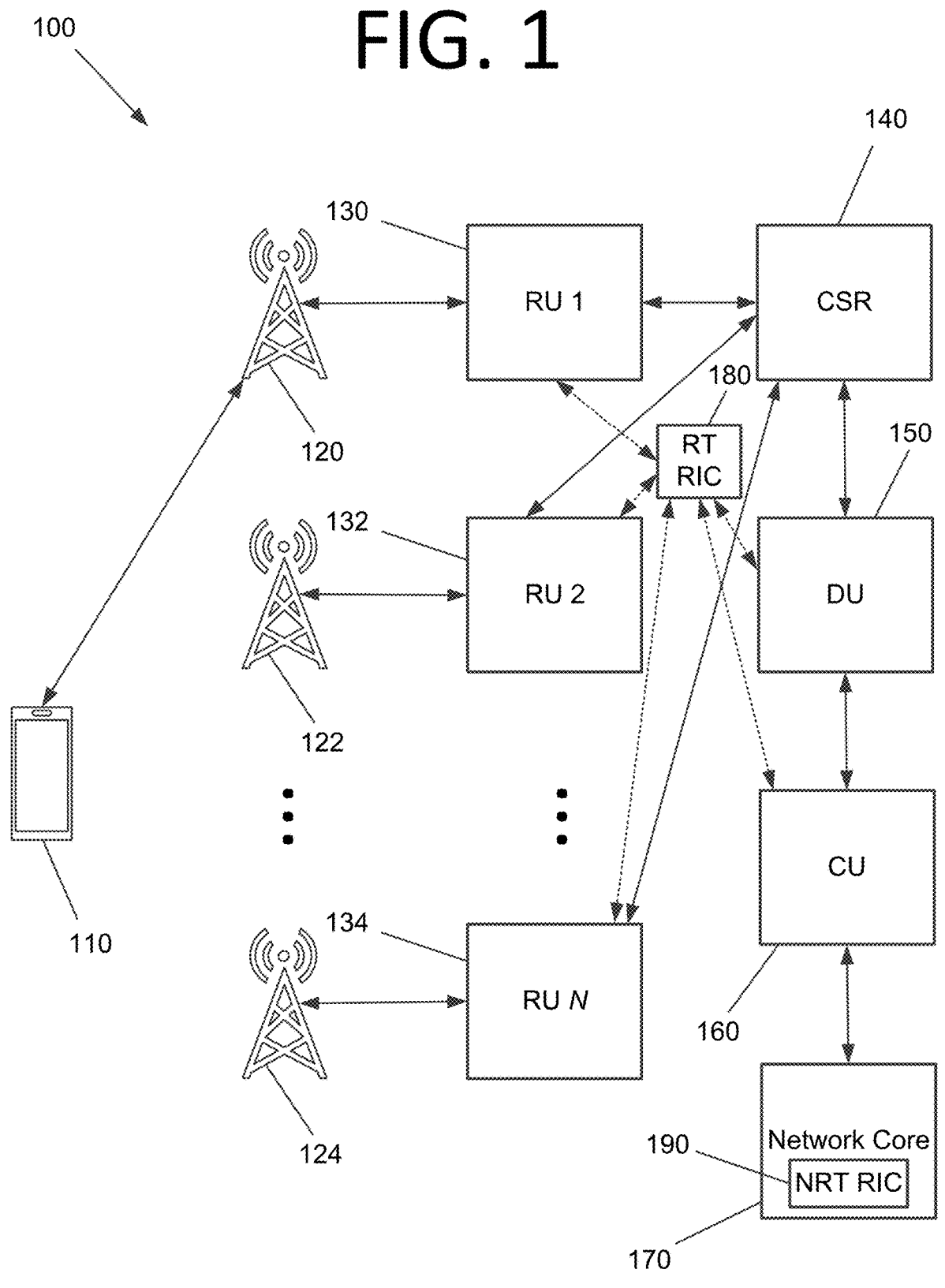
FIG. 1 is an architectural diagram illustrating an Open RAN (O-RAN), according to an embodiment of the present invention.

Some embodiments pertain to traffic balancing for moving users, proactive slice management, and predictive slice management using AI. In some embodiments, Radio Access Networks (RANs) are adjusted based on predicted data usage for moving users based on the applications they are running using AI/machine learning (ML) models. In certain embodiments, load balancing is performed when new users move into a coverage area. In some embodiments, predictive slice management is performed to allocate bandwidth to users for a period of time based on predicted application usage.

With respect to adjusting RANs based on predicted data usage for moving users based on the needs of the application(s) they are running, a RAN Intelligent Controller (RIC) may determine which application a user is using and which subscription a user has when the user moves into a new area or is to be handed over to a new base station. The RIC then uses trained AI/ML models to adjust configurations of one or more Next-Generation Node Bs (gNBs) in a Fifth Generation (5G) RAN that will serve the user. The RIC may also determine whether cell site(s) covering the user's area are down, whether band(s) are congested, whether one or more of the sites is at or near capacity, etc., and this may be taken into account when setting up the slice(s) for the user.

User traffic data from gNBs in the carrier network is sent to and stored in a data lake. The data lake is a repository that stores, processes, and secures large amounts of data. This data may be scalable and may be stored as structured and/or unstructured data. The traffic information, along with network reliability information and user profile information, is used to train AI/ML models to learn to modify RAN characteristics to ensure that the requisite bandwidth is available. For instance, the RIC, using the AI/ML models, determines how to dedicate the appropriate slice(s) to the user (e.g., which cell site(s) to use (e.g., cell towers, femtocells, picocells, microcells, etc.), which band(s) to use, whether to use Carrier Aggregation (CA), etc.).

CA may be inter-Distributed Unit (DU) CA in 5G Open RAN (O-RAN) embodiments, where the DUs are in one location and CA is performed between multiple towers (e.g., using a Time Division Duplexing (TDD) band from one tower aggregated with a Frequency Division Duplexing (FDD) band from another cell site). This may allow the RAN to process more bits and accommodate more users. CA can combine bands to get more capacity, particularly for downlink CA, where power constraints are less of an issue. Uplink CA may also be used. However, the mobile device has limited power, and this affects the communication range. Such determinations may take tower loading characteristics into account, and the user may be assigned to multiple frequency bands at the same cell site or split among multiple cell sites. This may be particularly beneficial for high data rate applications, such as video calls, streaming movies, video games, etc.

Upon handover of a call, the 5G network maintains and hands over the Quality of Service (QOS) flow from the source gNB to the target gNB. This 5G QoS framework and 5G enhanced mobility (make before break) guarantee service while supporting mobility for the user based on his or her subscription.

Load balancing is performed in some embodiments when new users move into a coverage area. For instance, if a user is located between two cell sites (e.g., as shown in scenario 400 of FIG. 4) and one cell site is congested, new users moving into the area would be served by the less congested cell site. Also, each cell site typically has different frequency bands, so CA can be performed across multiple towers in order to increase bit rates and/or to accommodate more users. Loading information is fed into one or more AI/ML models, which have been trained to load the cell sites more effectively based on the available spectrum. The AI/ML models may take into account what data rates are guaranteed for the user based on his or her policy, what applications the user is using, which cell site(s) and/or band(s) the user should be moved to, how fast the user is moving, whether CA should be used, etc.

Loads may be equalized between cell sites to the extent possible in order to allow each tower to take more new users. This also helps with power consumption. There is a significant amount of overhead at low power. Thus, if there are not many users in the coverage area, all users may be moved to a subset of the available cell sites and one or more cell sites may be put into sleep mode to conserve power.

With respect to performing predictive slice management to allocate bandwidth to users for a period of time based on predicted application usage, the AI/ML models may be trained to determine the characteristics of various applications. For instance, an AI/ML model may determine that a certain game is being used (e.g., using the App ID, Deep Packet Inspection (DPI), IP addresses, ports, etc.). Based on this determination, the AI/ML models may recommend what bandwidth to allocate and for how long. In other words, certain slice(s) are allocated for a certain period of time. This can be done on the fly via an xApp that uses the AI/ML models and runs in an RT RIC, for example.

In some embodiments, the user's data usage is monitored (e.g., in an rApp of a DU in a RAN). If the data usage exceeds what is allocated by the user's plan, a notification may be sent to a carrier application on the user's phone asking the user whether he or she would like to switch to a high bandwidth plan for a period of time for an additional fee (e.g., for an hour, a day, etc.). If the user agrees, the user's profile is switched to the higher bandwidth profile for that period of time. For instance, a regular profile user may be switched to a gamer profile.

FIG. 1 is an architectural diagram illustrating an O-RAN 100, according to an embodiment of the present invention. In the O-RAN architecture, RAN 100 includes three main building blocks: N Radio Units (RUs) 130, 132, . . . , 134, a DU 150 (although more than one DU may be included in RAN 100), and a Centralized Unit (CU) 160 (although more than one CU may be included in RAN 100). Typically, there are more DUs than CUs in the O-RAN architecture.

The key concept of O-RAN is "opening" the protocols and interfaces between the various building blocks (i.e., radios, hardware, and software) in the RAN. The O-RAN Alliance has defined various interfaces within the RAN, including those for fronthaul between the RU and the DU, midhaul between the DU and the CU, and backhaul connecting the RAN to the network core. The CU accommodates the higher protocol stack layers while the DU accommodates the lower protocol stack layers.

In RAN 100, RUs 130, 132, . . . , 134 transmit, receive, amplify, and digitize radio frequency signals and are operably connected to and located near and/or integrated into N respective antennae 120, 122, . . . , 124 of their cell sites. Each cellular telecommunications tower may have multiple RUs of RUs 130, 132, . . . , 134 to fully service various bands for a particular coverage area. DU 150 receives the digitized radio signals from respective RUs 130, 132, . . . , 134 that it manages via a Cellular Site Router (CSR) 140 that routes traffic from RUs 130, 132, . . . , 134 to DU 150.

DUs are the main processing units that are responsible for the High Physical, Media Access Control (MAC), and Radio Link Control (RLC) protocols in the RAN protocol stack under the Third Generation Partnership Project (3GPP). In other words, DUs are a logical encapsulation of the 3GPP stack. In O-RAN or virtualized RAN (vRAN), DUs are typically servers based on an Intel® architecture that are optimized to run the real time RAN functions located below split 2 and to connect with the RUs through a fronthaul interface based on O-RAN split 7-2x. DUs perform Layer 1 (L1) and Layer 2 (L2) processing.

After performing High Physical, MAC, and RLC operations, DU 150 sends digitized radio signals to a CU 160 for further processing. CU 160 is responsible for non-real time, higher L2 and Layer 3 (L3) functions. CU 160 also controls the operation of DU 150.

CU 160 runs the Radio Resource Control (RRC) and Packet Data Convergence Protocol (PDCP) layers. The gNB may include CU 160 and DU 150, which is connected to CU 160 via Fs-C (control plane (CP)) and Fs-U (user plane (UP)) interfaces for the CP and UP, respectively. However, per the above, there are multiple DUs in RAN 100 in some embodiments. If CU 160 has multiple such DUs, CU 160 supports multiple gNBs. The split architecture allows a 5G network utilize different distributions of protocol stacks between CU 160 and DUs, depending on midhaul availability and network design.

CU 160 is a logical node that includes gNB functions such as the transfer of user data, mobility control, RAN sharing (Multi-Operator RAN (MORAN)), positioning, session management etc., except for functions that are allocated exclusively to DU 150. CU 160 controls the operation of its DU(s) over the midhaul interface. In other words, CU 160 is connected to DU 150 via a midhaul link. CU 160 is also connected to a network core 170 via a backhaul link. Network core 170 is not technically part of RAN 100. In some embodiments, the backhaul link may be via satellite. Software of CU 160 can be co-located with DU software on the same server on site in some embodiments.

DU 150 is usually physically located at or near RUs 130, 132, . . . , 134 (e.g., at a cell site, in a Local Data Center (LDC), etc.), whereas CU 160 can be located nearer to network core 170 (e.g., in a Breakout Edge Data Center (BEDC)). In some cases, CU 160 may actually be located in network core 170. In some embodiments, DU 150 is offsite with respect to the cell site where respective RUs of RUs 130, 132, . . . , 134 are located, and DU 150 may be connected to CSR 140 by dark fiber, when available. For instance, dark fiber may connect CSR 140 to an LDC where DU 150 is housed. Alternatively, DU 150 may be located at the base of the cell site and connected to CU 160 via lit fiber.

A near-real time RAN Intelligent Controller (RT RIC) 180 runs xApps that interact with RUs 130, 132, . . . , 134, DU, 150, and CU 160. In some embodiments, RT RIC 180 is running on the same computing system that is running DU 150 and/or CU 160. RT RIC 180 should be located close to RUs 130, 132, . . . , 134, DU, 150, and CU 160 since there are maximum latency constraints (e.g., 10 milliseconds to 1 second). Thus, RT RIC 180 may be located in an LDC or a BEDC if sufficiently proximate to these components. In some embodiments, RT RIC 180 may be where CU 160 is located or one level above CU 160 (controlling multiple CUs) and is part of the management entity for RAN 100.

Network core 170 includes a non-real time RIC (NRT RIC) 190 that runs various rApps, typically with more than 1 second latency. In some embodiments, some or all AI/ML functionality may be performed by NRT RIC 190 (e.g., if not time critical). These rApps can communicate with RUs 130, 132, . . . , 134, DU, 150, and/or CU 160 indirectly via the backhaul interface between CU 160 and network core 170. NRT RIC 190 may be located in a BEDC, a Regional Data Center (RDC), a National Data Center (NDC), etc.

Figure 2:
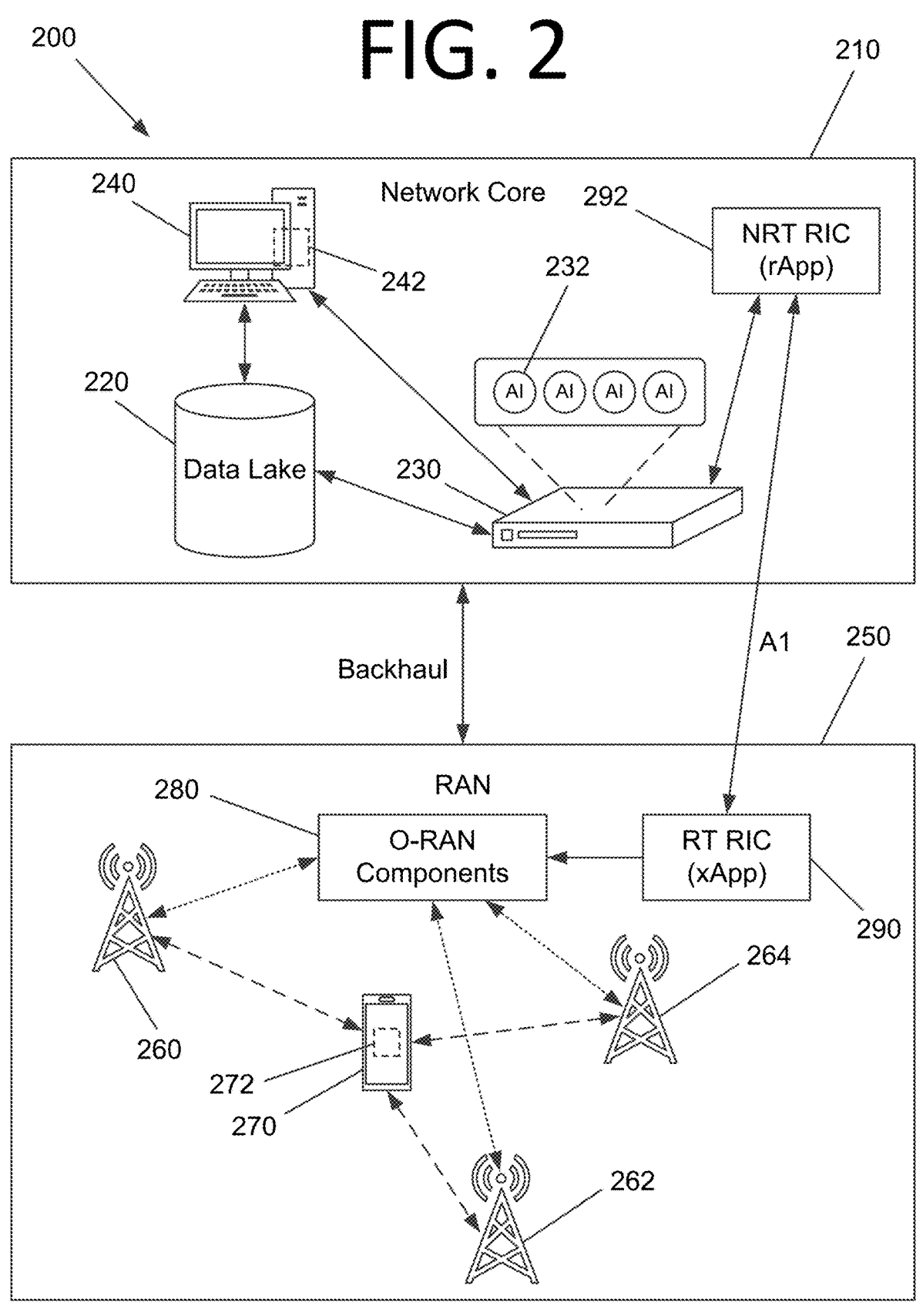
FIG. 2 is an architectural diagram illustrating a telecommunications system configured to perform traffic balancing for moving users, proactive slice management, and predictive slice management using AI, according to an embodiment of the present invention.

FIG. 2 is an architectural diagram illustrating a telecommunications system 200 configured to perform traffic balancing for moving users, proactive slice management, and predictive slice management using AI, according to an embodiment of the present invention. Telecommunications system 200 includes a network core 210 and a RAN 250. In some embodiments, network core 210 and RAN 250 may be network core 170 and RAN 100 of FIG. 1. In this example, RAN 250 includes three cell sites 260, 262, 264. However, RAN 250 may have any number of cell sites depending on the requirements of the implementation. In some embodiments, some or all of O-RAN components 280 (e.g., RUs, DU(s), and CU(s)) may be located at cell sites 260, 262, and/or 264.

Network core 210 provides higher level services for telecommunications system 200. Network core 210 may include BEDCs, RDCs, a NDC, etc. These data centers may be implemented in the cloud via dockerized clusters and run containerized Network Functions (NFs) in some embodiments. This allows service capacity to be spun up and spun down based on demand.

Network core 210 includes a data lake 220, servers 230, and training computing systems 240 in this embodiment. Network core 210 also includes an NRT RIC 292. In some embodiments, NRT RIC 292 may be located on servers 230. In certain embodiments, data lake 220 may be separate from network core 210 (e.g., provided by a third party cloud service provider).

Data lake 220 stores various information that is used for training AI/ML models 232 of servers 230. Labeling of data and/or training of AI/ML models 232 may be controlled by an AI management application 242 of training computing systems 240. The information stored in data lake 220 may include, but is not limited to, user profiles (e.g., whether the user is a gamer, a regular user, a VIP user, etc.), user traffic data and network reliability information from base stations of cell sites 260, 262, 264, carrier spectrum information (e.g., what bands the carrier operates and in which locations-see Table 1 below for example 5G bands for DISH Wireless®), etc. The network reliability information may include, but is not limited to, Physical Resource Block (PRB) usage, the percentage of PRB utilization on downlink and uplink, RRC connection drop rate, RRC connection success rate, handover success rate and latency, etc. User throughput requirement information, such as for an application 272 running on a mobile device 270, may also be provided.

TABLE 1

| DISH WIRELESS ® LICENSED 5G NEW RADIO (NR) BANDS | |
| --- | --- |
| 5G NR Band Number: | Frequency Band: |
| n71 | 600 megahertz (MHz) DD |
| n29 | 700 MHz Lower SMH Block E |
| n66 | 1.7/2.1 GHz AWS |
| n70 | 1.7/2.1 GHz AWS |
| n77 | 3.4 GHz C-Band |
| n48 | 3.5 GHz CBRS |
| n77 | 3.7 GHz C-Band |
| n258 | 24 GHz K-Band |
| n261 | 28 GHz Ka-Band |
| n260 | 39 GHz Ka-Band |
| n262 | 47 GHz V-Band |

Two or more of AI/ML models 232 may be chained in some embodiments (e.g., in series, in parallel, or a combination thereof) such that they collectively provide collaborative output(s). Using multiple AI/ML models may allow development of a more comprehensive picture of what is happening with respect to an application, for example. Patterns may be determined individually by an AI/ML model or collectively by multiple AI/ML models.

Each AI/ML model 232 is an algorithm that runs on the data, and the AI/ML model itself may be a deep learning neural network (DLNN) of trained artificial "neurons" that are trained on training data, for example. In some embodiments, AI/ML models 232 may have multiple layers that perform various functions, such as statistical modeling (e.g., hidden Markov models (HMMs)), and utilize deep learning techniques (e.g., long short term memory (LSTM) deep learning, encoding of previous hidden states, etc.) to perform the desired functionality. In order to train AI/ML models 232, training data (labeled, unlabeled, or both) from data lake 220 is used. AI/ML models 232 may be initially trained using this training data, and as new training data is available over time, one or more of AI/ML models 232 may be replaced with newly trained AI/ML models or be retrained to increase accuracy. Retraining may be performed in response to detecting data and/or model drift in some embodiments.

In some embodiments, generative AI models are used. Generative AI can generate various types of content, such as text, imagery, audio, and synthetic data. Various types of generative AI models may be used, including, but not limited to, LLMs, generative adversarial networks (GANs), variational autoencoders (VAEs), transformers, etc. These models may be part of AI/ML models 232 hosted on servers 230 in some embodiments. For instance, the generative AI models may be trained on a large corpus of information to perform semantic understanding, to understand bit rates that tend to be used by a given user profile, to understand the typical operating characteristics of the RANs in a given area, to learn typical congestion levels, etc.

In certain embodiments, generative AI models provided by an existing cloud ML service provider, such as OpenAI®, Google®, Amazon®, Microsoft®, IBM®, Nvidia®, Facebook®, etc., may be employed and trained to provide such functionality. These generative AI models may be accessed by servers 230 via the Internet. In generative AI embodiments where generative AI model(s) are remotely hosted, servers 230 can be configured to integrate with third-party Application Programming Interfaces (APIs), which allow servers 230 to send a request to the generative AI model(s) including the requisite input information and receive a response in return. Such embodiments may provide a more advanced and sophisticated user experience, as well as provide access to state-of-the-art natural language processing (NLP) and other ML capabilities that these companies offer.

One aspect of generative AI models in some embodiments is the use of transfer learning. In transfer learning, a pretrained generative AI mode, such as an LLM, is fine-tuned on a specific task or domain. This allows the LLM to leverage the knowledge already learned during its initial training and adapt it to a specific application. In the case of LLMs, the pretraining phase involves training an LLM on a large corpus of text, typically consisting of billions of words. During this phase, the LLM learns the relationships between words and phrases, which enables the LLM to generate coherent and human-like responses to text-based inputs. The output of this pretraining phase is an LLM that has a high level of understanding of the underlying patterns in natural language.

In the fine-tuning phase, the pretrained LLM is adapted to a specific task or domain by training the LLM on a smaller dataset that is specific to the task. For instance, in some embodiments, the LLM may be trained to analyze a certain type or multiple types of data sources to improve its accuracy with respect to their content. Such information may be provided as part of the training data, and the LLM may learn to focus on these areas and more accurately identify data elements therein. Fine-tuning allows the LLM to learn the nuances of the task or domain, such as the specific vocabulary and syntax used in that domain, without requiring as much data as would be necessary to train an LLM from scratch. By leveraging the knowledge learned in the pretraining phase, the fine-tuned LLM can achieve state-of-the-art performance on specific tasks with a relatively small amount of training data.

LLMs may be trained using a vector database in some embodiments. Vector databases index, store, and provide access to structured or unstructured data (e.g., text, images, time series data, etc.) alongside the vector embeddings thereof. Data such as text may be tokenized, where single letters, words, or sequences of words are parsed from the text into tokens. These tokens are then "embedded" into the vector embeddings, which are the numerical representations of this data. Vector databases allow software to find and retrieve similar objects quickly and at scale in production environments.

AI and ML allow unstructured data to be numerically represented without losing the semantic meaning thereof in vector embeddings. A vector embedding is a long list of numbers, each describing a feature of the data object that the vector embedding represents. Similar objects are grouped together in the vector space. In other words, the more similar the objects are, the closer that the vector embeddings representing the objects will be to one another. Similar objects may be found using a vector search, similarity search, or semantic search. The distance between the vector embeddings may be calculated using various techniques including, but not limited to, squared Euclidean or L2-squared distance, Manhattan or L1 distance, cosine similarity, dot product, Hamming distance, etc. It may be beneficial to select the same metric that is used to train the AI/ML model.

Vector indexing may be used to organize vector embeddings so data can be retrieved efficiently. Calculating the distance between a vector embedding and all other vector embeddings in the vector database using the k-Nearest Neighbors (kNN) algorithm can be computationally expensive if there are a large number of data points since the required calculations increase linearly (i.e., O(n)) with the dimensionality and the number of data points. It is more efficient to find similar objects using an approximate nearest neighbor (ANN) approach. The distances between the vector embeddings are pre-calculated, and similar vectors are organized and stored close to one another (e.g., in clusters or a graph) similar objects can be found faster. This process is called "vector indexing." ANN algorithms that may be used in some embodiments include, but are not limited to, clustering-based indexing, proximity graph-based indexing, tree-based indexing, hash-based indexing, compression-based indexing, etc.

An RT RIC 290 includes an xApp that runs the trained and deployed AI/ML models (i.e., versions of AI/ML models 232 once training has been performed). RT RIC 290 is a platform that allows closed-loop control of optimization applications for RAN 250 to be onboarded as xApps. RT RICs run the low latency timescale control loop logic operating on a timescale between 10 milliseconds (ms) and 1 second. However, non-time critical aspects of the functionality of RT RIC 290 may be performed by rApps of NRT RIC 292 instead.

An A1 interface enables communication between RT RIC 290 and NRT RIC 292. The A1 interface supports policy management, data transfer, and machine learning management. The data (called "enrichment information") sent via the A1 interface is used for assisting AI/ML model training for RT RIC 290. In other words, the AI/ML models used by RT RIC 290 are deployed to RT RIC 290 by NRT RIC 292. However, in some embodiments, the AI/ML models may be deployed to RT RIC 290 by another application or computing system of network core 290.

The xApps use platform services available in RT RIC 290 to communicate with downstream NFs through the E2 interface, which is a network interface carrying events, control, and policy information to the O-RAN NFs. The downstream NFs can be gNB O-DU, gNB O-CU-CP, gNB O-CU-UP, and/or O-eNB, for example. The E2 interface allows southbound nodes setup the E2 interface and register the list of applications the southbound nodes support, allows xApps running in near-real time RIC 290 to subscribe for events from the southbound nodes (e.g., as prescribe an action to execute upon encountering an event, such as report the event, report and wait for further control instructions from the xApp, or execute a policy), and provides control instructions.

RT RIC 290 and/or NRT RIC 292 provides information to RAN components 280 and implements the slice(s) for mobile device 270 based on the application requirements and the user profile (e.g., user subscription information from the PCF). Active users may also be prioritized based on their subscriptions. The slice(s) are configured to provide the amount of data that is anticipated to be sent/received by the application. The AI/ML models of RT RIC 290 and/or NRT RIC 292 are trained to predict these requirements. The slices could provide guaranteed downlink throughput, uplink throughput, latency, etc.

In Third Generation Partnership Project (3GPP) specifications, a network slice consists of a radio network and a core network. Some parts of the network resources may be shared across multiple network slices, while others may be unique to a single slice. 5G slicing may also include resource partitioning in the radio network per slice. In 5G, one mobile device may connect to more than one slice simultaneously (up to 8 slices at a given time), which was not supported in the Evolved Packet Core (EPC) architecture of 4G.

A specific network slice is defined by a parameter called Single Network Slice Selection Assistance Information (S-NSSAI). S-NSSAI can include two sub-parameters—the Slice/Service Type (SST) and the optional Slice Differentiator (SD). SD is used to differentiate between multiple slices having the same type (i.e., having the same SST).

The radio network (i.e., Radio Access Network (RAN)) serving the mobile device may use one or more S-NSSAI values requested by the mobile device to do the initial selection of that Access and Mobility Management Function (AMF). The AMF decides to serve the specific mobile device, make a new slice selection itself, or use the Network Slice Selection Function (NSSF). The NSSF supports the selection of network slices based on a combination of S-NSSAI values defined by the network, requested by the mobile device, and allowed in the subscription for the mobile device.

Individual slices may have various configurations. For instance, in one example, a slice may have its own AMF, Session Management Function (SMF), and User Plane Function (UPF). In another example, multiple slices may have their own SMF and UPF, but share an AMF.

The functionality of the UPF is controlled by the SMF. The UPF interacts with internal and external IP networks and acts as an anchor point for the mobile device towards external networks, hiding the mobility. This means that an IP address of a specific mobile device Protocol Data Unit (PDU) session is routable to the UPF that serves the mobile device and the session.

The UPF processes and forwards user data, and more specifically, is responsible for routing and forwarding user plane packets between the gNB and the external data network. Uplink packets arriving from the gNB use a General Packet Radio Services (GPRS) Tunneling Protocol User Plane (GTP-U) tunnel to reach the UPF. The UPF removes the packet headers belonging to the GTP-U tunnel before forwarding the packets into the external data network. Since the UPF may provide connectivity towards multiple data networks, the UPF should ensure that packets are forwarded towards the correct network. Each GTP-U tunnel belongs to a specific PDU session, and each PDU session is setup towards a specific Data Network Name (DNN). The DNN identifies the external network to which the user plane packets should be forwarded. Thus, the UPF keeps a record of the mapping between the GTP-U tunnel, the PDU session, and the DNN.

Downlink packets arriving from the external data network are mapped onto specific QoS flows belonging to specific PDU sessions before forwarding towards the appropriate gNB. A QoS flow corresponds to a stream of packets that have an equal QoS, and a single PDU session can have multiple QoS flows. The UPF receives from a set of Service Data Flow (SDF) templates from the SMF during the setup of the PDU session and uses these templates to map each downlink packet onto a specific QoS flow. SDF templates provide a set of rules for this mapping process and are generated by the SMF from information provided by the Policy Control Function (PCF). The SDF templates in some embodiments have the appropriate rules to map application packets to the correct QoS flow(s).

After the UPF identifies the appropriate QoS flow for a packet using the SDF templates, the UPF forwards the packets across the GTP-U tunnel belonging to the parent PDU session. It should be noted that there is one GTP-U tunnel per PDU session rather than one GTP-U tunnel per QoS flow. The UPF marks the GTP-U header to indicate the QoS flow associated with each packet (i.e., the QoS Flow Identity (QFI)). The Differentiated Services Code Point (DSCP) field within the IP header can be used for this purpose. In some embodiments, the mapping of a packet to a QoS flow is based on 5-tuples, including the Internet Protocol (IP) addresses, the port numbers, and the DSCP.

The UPF performs various types of processing of the forwarded data. The UPF generates charging data and traffic usage reports and performs Deep Packet Inspection (DPI). The UPF also executes on various network or user policies, such as enforcing gating, redirection of traffic, applying different data rate limitations, etc. When a mobile device is in an idle state and not immediately reachable by the network, the traffic sent towards the mobile device is buffered by the UPF, which triggers a page from the network to force the mobile device to go back to a connected state and receive the buffered data. In other words, the UPF is responsible for notifying the SMF when downlink data arrives for a mobile device that is in an idle state, as well as for triggering the page to connect the mobile device.

The 5G core UPF can be employed in series, where one UPF is distributed towards the edge of the network and the other UPF is located in a more central network site (e.g., an RDC). Network rules can then be used to control the traffic forwarding of the distributed UPF closer to the network edge. Classification of the data packets coming from the mobile device (uplink packets) can be applied to determine whether the data should be sent out onto a local, distributed IP network or whether the data packets should be forwarded to the centralized UPF.

The UPF can also apply QoS marking of packets towards the RAN or towards external networks. The QoS marking can be used by the transport network to handle each packet with the right priority in the case of network congestion, for example. Appropriately marked packets may be used to provide the QoS flow(s) discussed herein.

A 5G provider may decide to expose its 5G core network through the Network Exposure Function (NEF). The NEF supports interaction with external applications, exposing network capabilities that can be used in various ways by these applications. Some functions that may be available via the NEF provide monitoring network events associated with mobile devices, provisioning, and policy and charging control.

The CU(s) of RAN 250 manage Service Level Agreements (SLAs), but most traffic management decisions are made at the DU level since DUs manage the High Physical and MAC layers using a feed from RT RIC 290. For instance, the DUs manage the PRBs that are allocated to the slices. Every spectrum has a maximum number of PRBs that it can be sliced into.

The AI/ML models learn to configure RAN 250 based on user profiles and the applications used by these users. The variations in the local spectrum that is available from one market to another should be taken into account. A separate AI/ML model may be trained for each class of user in some embodiments. For instance, user profiles may be divided into gamers, regular users, and VIP users and respective AI/ML models may be used by RT RIC 290 and/or NRT RIC 292 for each type. Any suitable number and type of user profiles may be used without deviating from the scope of the invention.

Signal information (e.g., signal strength, Signal-to-Noise Ratio (SNR), Signal-to-Interference-plus-Noise Ratio (SINR), jitter, packet loss information, etc.) from cell sites 260, 262, 264 collected by mobile device 270 and other mobile devices may be fed to RT RIC 290 or NRT RIC 292. This information may help RT RIC 290 or NRT RIC 292 to determine cell site loading characteristics and decide which cell cites/bands to allocate to mobile device 270. The cell sites/bands that are assigned to mobile device 270 may be changed over time as the mobile device moves, network congestion changes, higher priority users move into a coverage area, the characteristics of the signals received by mobile device 270 from cell sites 260, 262, 264 changes, etc. Active load sharing between cell sites 260, 262, 264 may also be performed.

Figure 3:
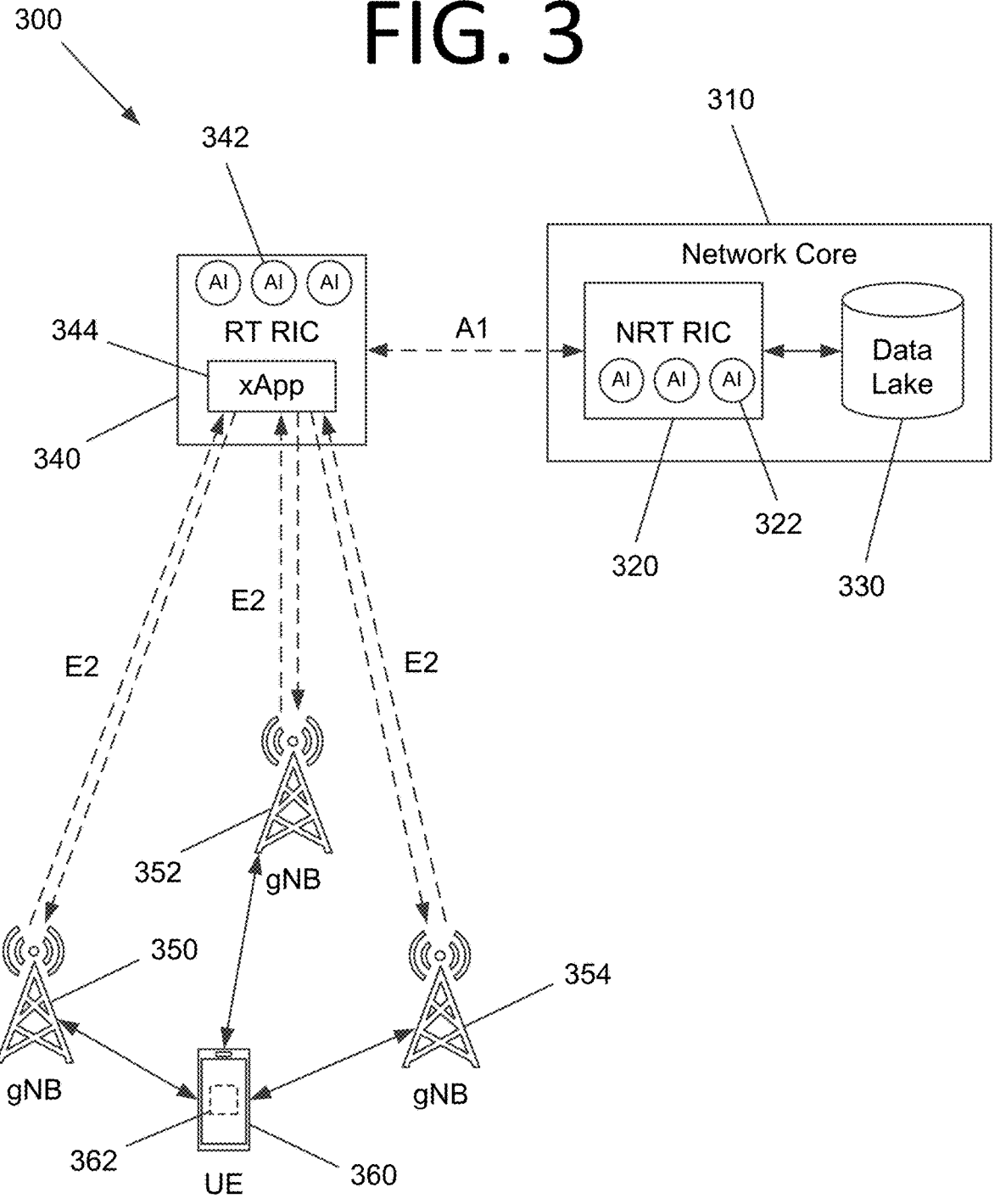
FIG. 3 is an architectural diagram illustrating a proactive slice management system, according to an embodiment of the present invention.

FIG. 3 is an architectural diagram illustrating a proactive slice management system 300, according to an embodiment of the present invention. Traffic information collected by gNBs 350, 352, 354, signal information collected from mobile devices such as mobile device 360, and subscriber profile information is provided to a data lake 330 of a network core 310. However, in some embodiments data lake 330 may be outside of network core 330 (e.g., hosted by a third party cloud service provider). This information is used by an NRT RIC 320 to train AI/ML models 322.

Once trained, at least some of AI/ML models 322 are sent via an A1 interface to a RT RIC 340. RT RIC 340 stores and deploys these models locally as AI/ML models 342. An xApp 344 is configured to use deployed AI/ML models 342 to perform traffic balancing for moving users, proactive slice management, and predictive slice management using AI for different subscriber types.

xApp 344 and RT RIC 340 communicate with gNBs 350, 352, 354 via E2 interfaces. gNBs 350, 352, 354 send network availability information to RT RIC 340 via the E2 interfaces. gNBs 350, 352, 354 also send signal information for mobile device 360.

xApp 344 processes this information using AI/ML models 342 and determines slice characteristics for mobile device 360 that are suitable for application(s) 362 that mobile device 360 is likely to be running based on the user profile for the respective subscriber. xApp 344 then sends control information to one or more of gNBs 350, 352, 354 via the E2 interface(s). The respective gNB(s) of gNBs 350, 352, 354 then setup the slice(s) for mobile device 360 based on this control information. This may include assigning, bit rates, one or more bands, and/or one or more cell sites to mobile device 360. Mobile device 360 and the respective gNB(s) of gNBs 350, 352, 354 then uses these slice(s) for communications to and from mobile device 360.

Figure 4:
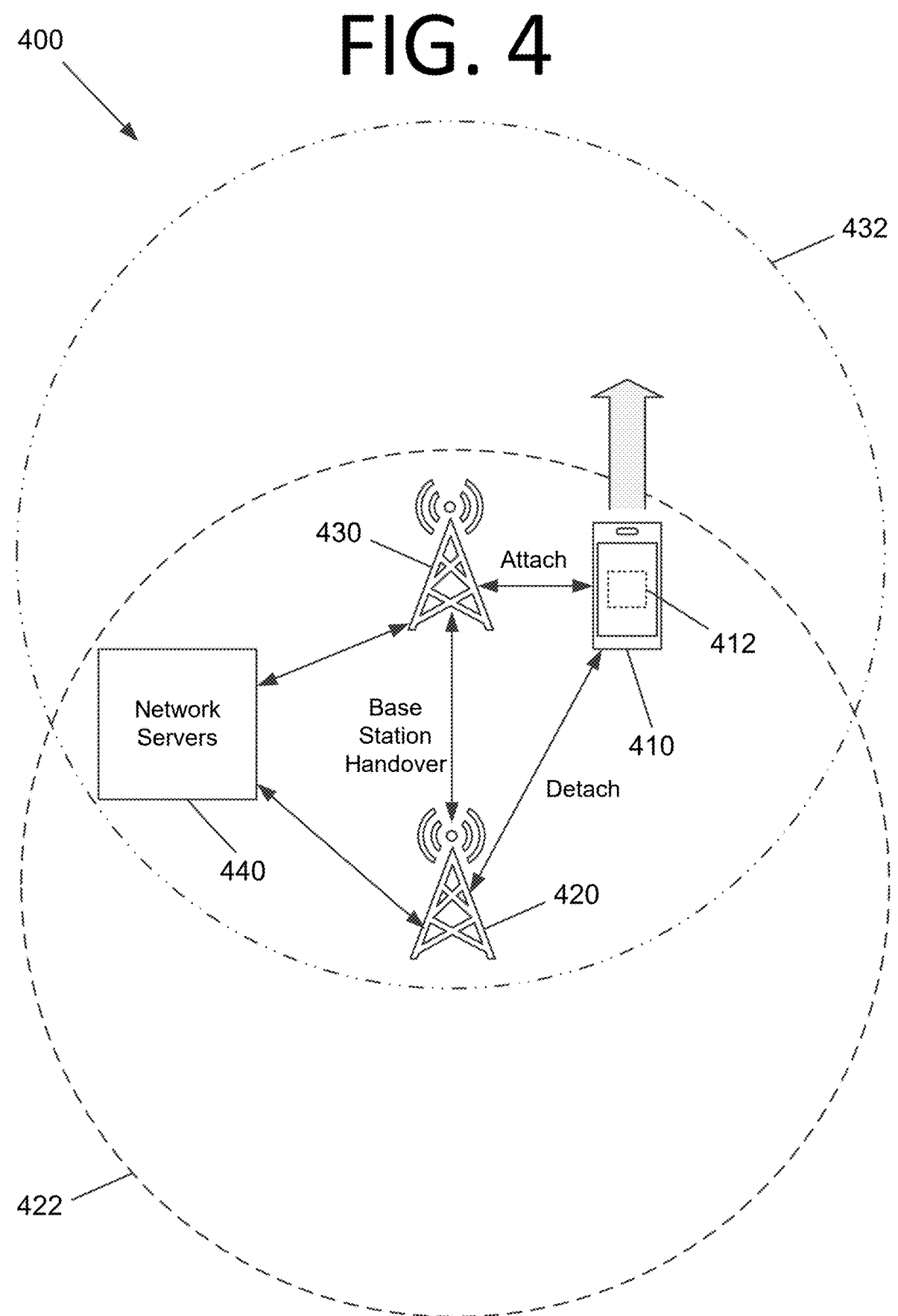
FIG. 4 illustrates a handover scenario, according to an embodiment of the present invention.

FIG. 4 illustrates a handover scenario 400, according to an embodiment of the present invention. A mobile device 410 is running an application 412 and has one or more QoS flows provided via gNB 420, which has coverage area 422. Another gNB 430 has a coverage area 432, and mobile device 410 is located within both coverage area 422 and coverage area 432, which partially overlap. Coverage areas 422, 432 may be provided by a home network and a roaming partner, may be part of the same or different RANs but provided by the same carrier, etc.

gNB 420 sends/receives user plane data for mobile device 410 via network servers 440, which may be servers of an LDC, a Performance Edge Data Center (PEDC), a BEDC, an RDC, any combination thereof, etc. It should also be noted that while network servers 440 are shown as being within coverage areas 422, 432 for the purposes of FIG. 4, network servers may be in any suitable location(s) without deviating from the scope of the invention. Network servers 440 provide AMF, UPF, DPI, SMF, PCF, etc.

Mobile device 410 is moving away from coverage area 422 and deeper into coverage area 432. Accordingly, it is desirable to handover mobile device 410 from base station 420 to base station 430. The handover may be an Xn-based handover procedure, if supported, or an N2-based handover procedure. N2 is the logical reference point between gNBs 420, 430 and the AMF of network servers 440. Handover may be triggered due to a measurement report from mobile device 410 or by gNB 420 itself. 5G supports several new enhanced handovers, including conditional handover, Dual Active Protocol Stack (DAPS) handover, and new Rel-18 L1/L2-based handover.

gNB 420 extracts the Target Cell Global Identity from a database of neighbor relations at gNB 420. Mobile device 410 may identify the target cell (i.e., cell 432) using a Physical layer Cell Identity (PCI). gNB 420 then maps that PCI onto target cell 432.

gNB 430 is provided with a Globally Unique AMF Identity (GUAMI) by gNB 420. This informs gNB 430 with the identity of the AMF of network servers 440 that will be used to serve mobile device 410. Mobile device 410 detaches from gNB 420 and attaches to gNB 430.

An xApp of the RT RIC that controls gNB 430 uses AI/ML models and user profile data for mobile device 410 to determine the slice characteristics for that user. The xApp/RT RIC then instructs gNB 430 to configure the slice(s) for mobile device 410 accordingly. In this manner, an appropriate QoS can be maintained for the user as he or she moves from one coverage area to another. The UPF of network servers 440 then sends communications to/receives communications from gNB 430 in accordance with this QoS flow.

This handover scenario differs from traditional handover. The user may be mapped to a better Allocation and Retention Priority (ARP) based on his or her profile (e.g., if the user has a higher cost subscription). The target gNB (i.e., gNB 430) will accommodate this traffic even if the target gNB is congested. The target gNB will thus minimize the packet latency and minimize (or if possible, eliminate) packet loss during the handover.

Figure 5:
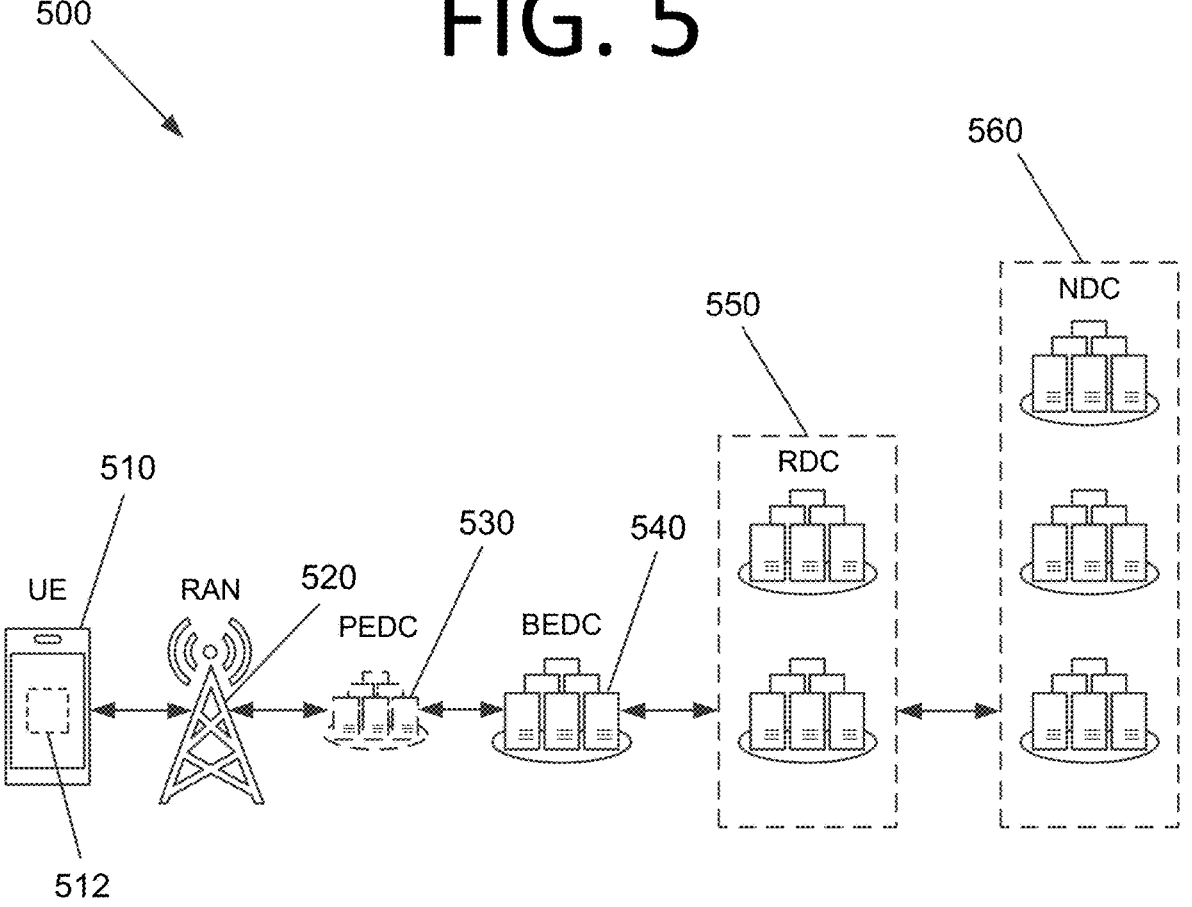
FIG. 5 is an architectural diagram illustrating a wireless telecommunications system, according to an embodiment of the present invention.

FIG. 5 is an architectural diagram illustrating a wireless telecommunications system 500, according to an embodiment of the present invention. User equipment (UE) 510 (e.g., a mobile phone, a tablet, a laptop computer, a smart watch, etc.) running an application 512 communicates with a RAN 520. In some embodiments, RAN 520 may be a 5G New Radio O-RAN implementation where cell sites include antennas operably connected to RUs, which are operably connected to a DU, which, in turn, is operably connected to a CU.

RAN 520 sends communications to UE 510, as well as from UE 510 further into the carrier network. In some embodiments, communications are sent to/from RAN 520 via a PEDC 530 to provide lower latency. However, in some embodiments, RAN 520 communicates directly with a BEDC 540. In some embodiments, the DU and/or CU are located in an LDC (not shown) and/or BEDC 340. BEDCs are typically smaller data centers that are proximate to the populations they serve. BEDCs may break out User Plane Function data traffic (UPF-d) and provide cloud computing resources and cached content to UE 510, such as providing Network Function (NF) application services for gaming, enterprise applications, etc.

The carrier network may provide various NFs and other services. For instance, BEDC 540 may provide cloud computing resources and cached content to UE 510, such as providing NF application services for gaming, enterprise applications, etc. An RDC 550 may provide core network functions, such as UPF-v, UPF-d (if not in BEDC 540, for example), SMF, and AMF functionality. The SMF includes Packet Data Network Gateway (PGW) Control Plane (PGW-C) functionality. The UPF includes PGW User Data Plane (PGW-U) functionality.

An NDC 560 may provide UDR and user verification services, for example. Other network services that may be provided may include, but are not limited to, IP Multimedia Subsystem (IMS)+Telephone Answering Service (TAS), IP-SM Gateway (IP-SM-GW) (the network functionality that provides the messaging service in the IMS network), Enhanced Serving Mobile Location Center (E-SMLC) for former generation wireless networks, Gateway Mobile Location Center (GMLC), Location Retrieval Function (LRF), Location Management Function (LMF), Home Location Register (HLR), Home Subscriber Server (HSS), Unified Data Management (UDM), Authentication Server Function (AUSF), Unified Data Repository (UDR), Short Message Service Center (SMSC), PCF, Mobile Edge Computing (MEC), Network Exposure Functions (NEFs) or Common API Framework (CAPIF) for Third Generation Partnership Project (3GPP) northbound APIs, Network Slice Selection Function (NSSF), Non-3GPP InterWorking Function (N3IWF), Network Data Analytics Function (NWDAF), Mediation and Delivery Function (MDF), Service Communication Proxy (SCP), and/or Security Edge Protection Proxy (SEPP) functionality. It should be noted that additional and/or different network functionality may be provided without deviating from the present invention. The various functions in these systems may be performed using dockerized clusters in some embodiments.

BEDC 540 may utilize other data centers for NF authentication services. RDC 550 receives NF authentication requests from BEDC 540. RDC 550 may help with managing user traffic latency, for instance. However, RDC 550 may not perform NF authentication in some embodiments.

From RDC 550, NF authentication requests may be sent to NDC 560, which may be located far away from UE 510, RAN 520, PEDC 530, BEDC 540, and RDC 550. User verification may be performed at NDC 560. An AI/ML system that performs the various AI functionality described herein may be located in RAN 520 (e.g., in an RT RIC thereof) and/or in BEDC 340, RDC 350, any combination thereof, etc. (e.g., in an NRT RIC thereof). In some embodiments, one or more of the AI/ML models may be external to the network and accessed by network computing systems via the Internet.

It should be noted that wireless telecommunications system 500 of FIG. 5 is only one of multiple possible network configurations. For instance, if a cell site of RAN 520 is located in the same city as RDC 550, RAN 520 may connect directly to RDC 550. Any suitable network configuration may be used without deviating from the scope of the invention.

Figure 6:
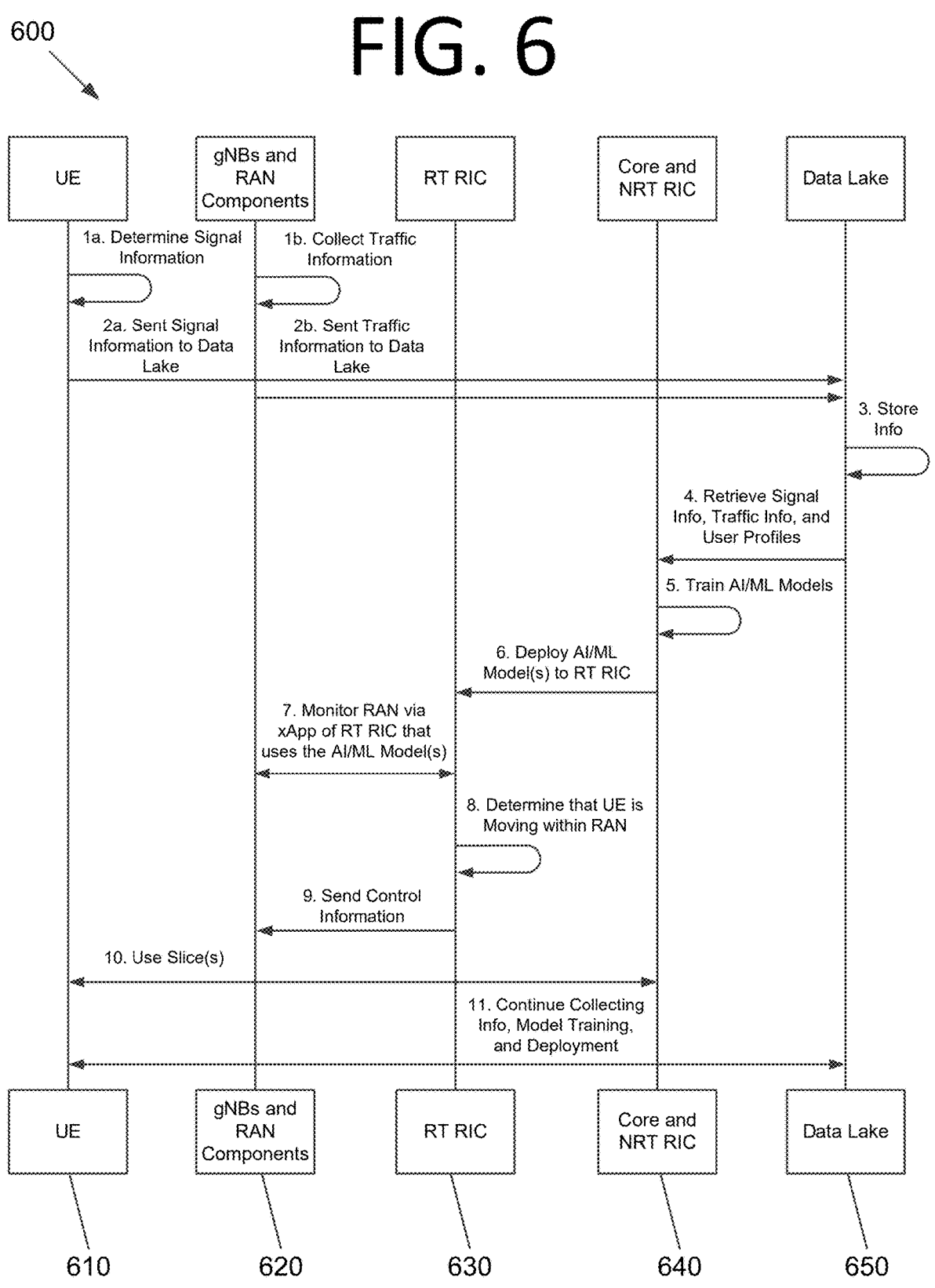
FIG. 6 is a flow diagram illustrating a process for adjusting RANs based on predicted data usage for moving users based on the needs of the application(s) they are running, according to an embodiment of the present invention.

FIG. 6 is a flow diagram illustrating a process 600 for adjusting RANs based on predicted data usage for moving users based on the needs of the application(s) they are running, according to an embodiment of the present invention. UE 610 and other UE devices determine signal information for the cell sites of a RAN. gNBs 620 of the RAN also collect traffic information for their respective cell sites. The collected information is sent to a data lake 650, which also stores user profile information (e.g., a regular user, a gamer, a VIP, etc.).

An NRT RIC 640 retrieves the signal information, traffic information, user profiles, carrier spectrum information, network congestion information, etc., and uses this information to train AI/ML models. Once trained, the AI/ML models that are used to make decisions quickly for the RAN are deployed to an RT RIC 630 via an A1 interface between RT RIC 630 and NRT RIC 640. An xApp of RT RIC 630 is configured to use these AI/ML model(s) to perform traffic balancing for moving users. More specifically, the xApp uses the AI/ML models to monitor the RAN, which sends network availability information (and potentially signal information from mobile devices in the RAN) to RT RIC 630 via E2 interfaces.

When a user with a certain profile is moving (e.g., being handed over from one or more cell sites to one or more other cell sites), the xApp of RT RIC 630 predicts how the network slice(s) should be configured for that user. The xApp then sends control information to the appropriate gNB(s) 620 via the respective E2 interface(s) instructing gNB(s) 620 configure the slice(s) appropriately for that user based on the user profile and expected RAN usage. This may include assigning bit rates, assigning one or more bands, assigning one or more cell sites, setting up CA, etc. for UE 610. The slice(s) are configured to provide the amount of data that is anticipated to be sent/received by application(s) that may be running on UE 610. The slices could provide guaranteed downlink throughput, uplink throughput, latency, etc. UE 610 and respective gNB(s) 620 then use these slice(s) for communications to and from UE 610. The network continues collection of the signal information and the traffic information, and the AI/ML models are retrained and/or new AI/ML models are trained using the newly collected data as well.

Figure 7:
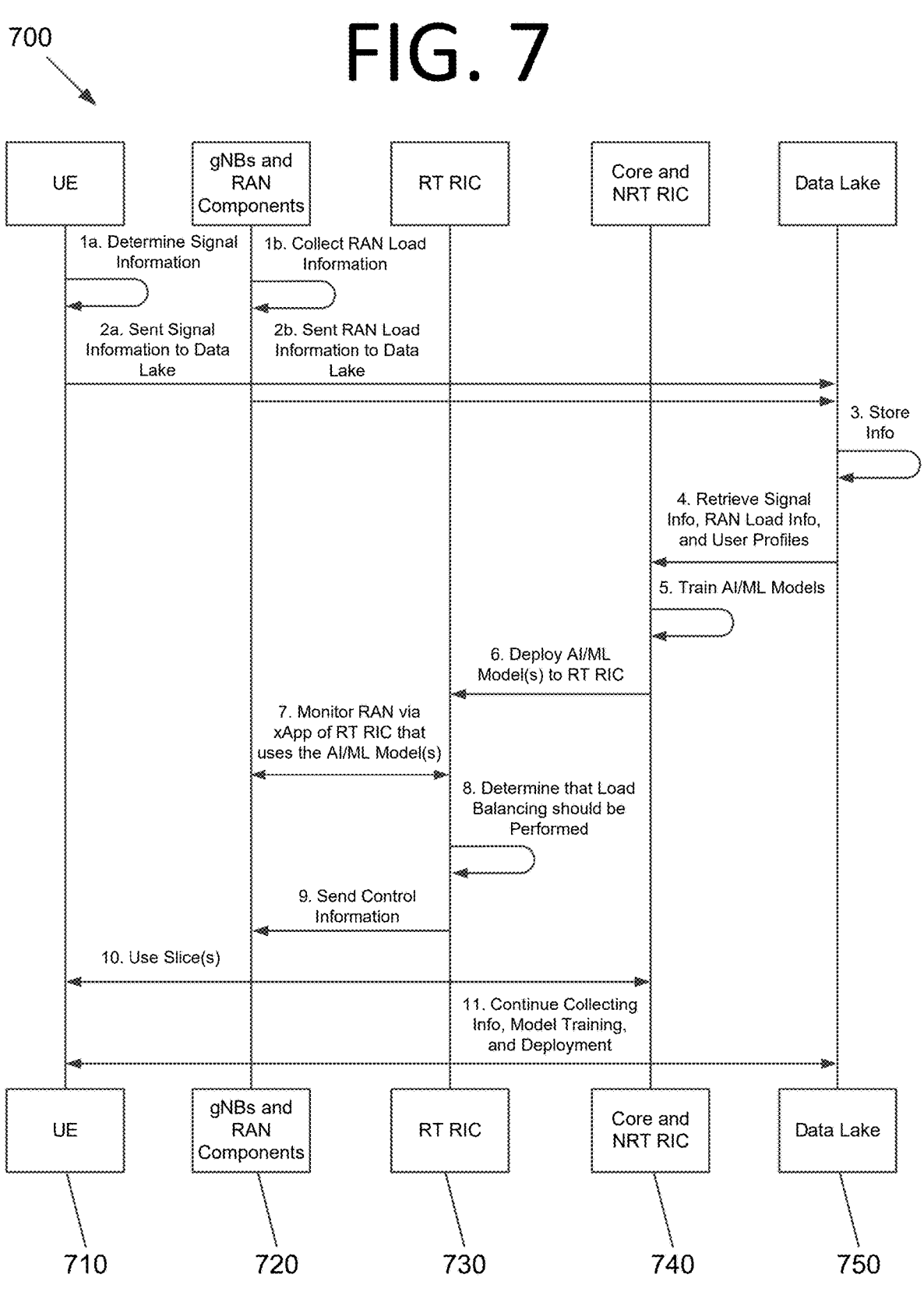
FIG. 7 is a flow diagram illustrating a process for performing load balancing when new users move into a coverage area, according to an embodiment of the present invention.

FIG. 7 is a flow diagram illustrating a process 700 for performing load balancing (i.e., proactive slice management) when new users move into a coverage area, according to an embodiment of the present invention. "Proactive" slice management means that the network anticipates the effect of new UE device(s) coming into a coverage area and attempts to accommodate these effects at the time of coverage area entry/handover rather than retroactively performing slice management after the UE device(s) affect the network. Like FIG. 6, process 700 involves UE 710, gNBs and RAN components 720, an RT RIC 730, a network core and NRT RIC 740, and a data lake 750. UE 710 and other UE devices determine signal information for the cell sites of a RAN. gNBs 720 of the RAN also collect RAN load information for their respective cell sites. This information may include the number of users for each cell site and their respective frequency bands, which application the users are using (e.g., via App IDs in the packets and/or DPI), network usage, which cell sites are in range of a user, etc. The collected information is sent to a data lake 750, which also stores what data rates are guaranteed to users based on their policies.

An NRT RIC 740 retrieves the signal information, load information, user policy information, carrier spectrum information, etc., and uses this information to train AI/ML models. Once trained, the AI/ML models that are used to make decisions quickly for the RAN are deployed to an RT RIC 730 via an A1 interface between RT RIC 730 and NRT RIC 740. An xApp of RT RIC 730 is configured to use these AI/ML model(s) to perform proactive load balancing. More specifically, the xApp uses the AI/ML models to monitor the RAN, which sends network availability and load information (and potentially signal information from mobile devices in the RAN) to RT RIC 730 via E2 interfaces. The xApp may thus determine overall RAN usage, individual cell site loads, and power consumption. The load balancing may be performed when a user moves into a coverage area, when a predetermined number of users move into the coverage area, periodically, etc.

The xApp and RT RIC 730 may determine that new users moving into the coverage area should be moved to certain cell site(s) based on current RAN load conditions. For instance, new users may be served by less congested cell site(s), existing users may be moved to different cell sites to balance the RAN load and/or to reduce power consumption (e.g., putting one or more cell sites into sleep mode). In some cases, CA can be performed across multiple towers in order to increase bit rates and/or to accommodate more users in accordance with their respective policies.

The xApp sends control information to the appropriate gNB(s) 720 via the respective E2 interface(s) instructing gNB(s) 720 configure the slice(s) appropriately to balance the network load. This may include assigning bit rates, assigning one or more bands, assigning one or more cell sites, setting up CA, etc. for UE 710 and other UE devices in the RAN. The slices could provide guaranteed downlink throughput, uplink throughput, latency, etc. in accordance with the policies of the users. If the network is congested, the bit rates of users with lower quality subscriptions may be reduced and/or some lower quality subscription users may be dropped. UE 710 and respective gNB(s) 720 then use these slice(s) for communications to and from UE 710 and the other UE devices in the coverage area. The network continues collection of the signal information and the RAN load information, and the AI/ML models are retrained and/or new AI/ML models are trained using the newly collected data as well.

Figure 8A:
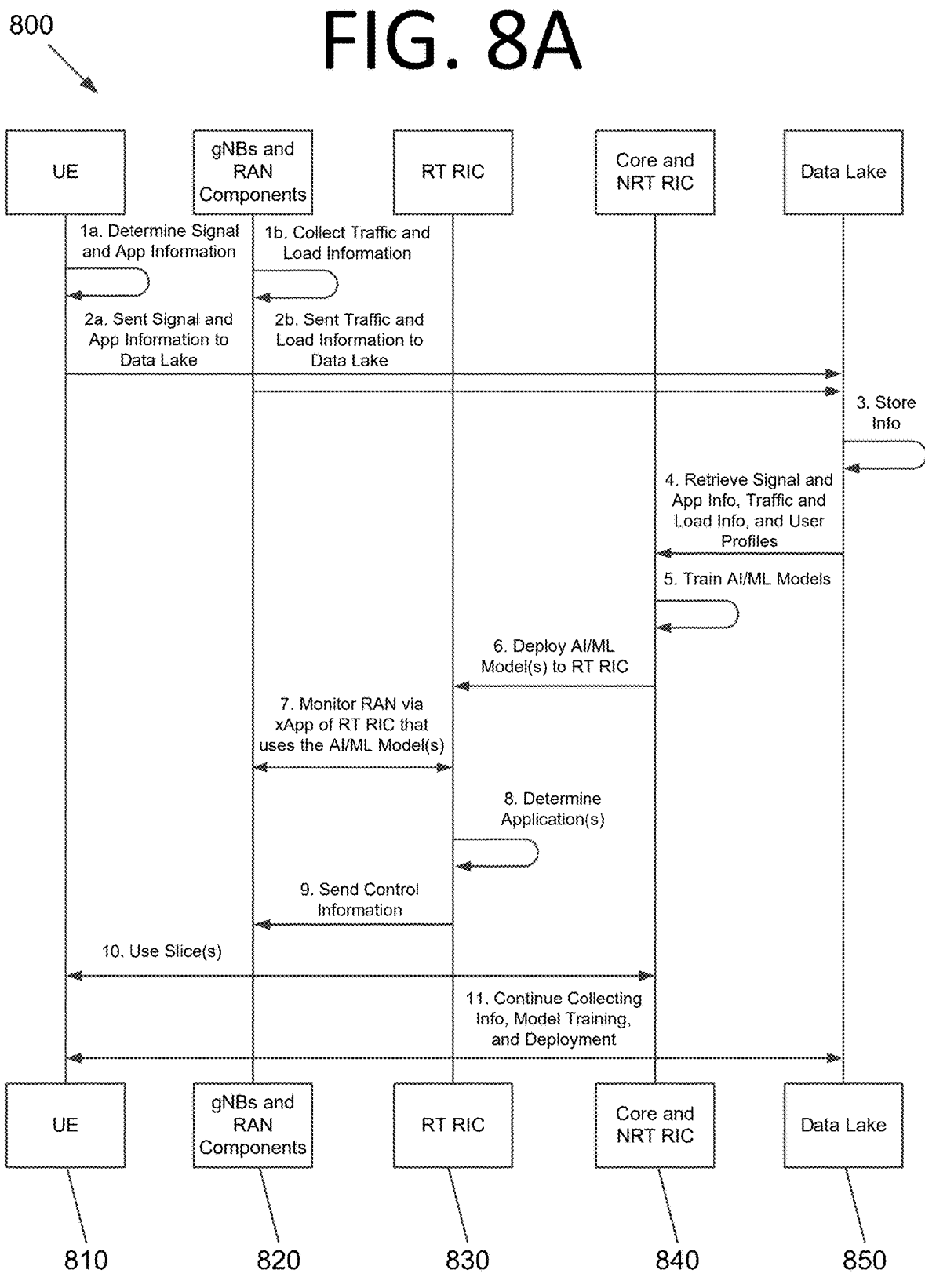
FIG. 8A is a flow diagram illustrating a process for performing predictive slice management to allocate bandwidth to users for a period of time based on predicted application usage, according to an embodiment of the present invention.

FIG. 8A is a flow diagram illustrating a process 800 for performing predictive slice management to allocate bandwidth to users for a period of time based on predicted application usage, according to an embodiment of the present invention. Like FIG. 6, process 800 involves UE 810, gNBs and RAN components 820, an RT RIC 830, a network core and NRT RIC 840, and a data lake 850. Different applications have different network usage characteristics. For instance, video applications and video games tend to have considerably higher bit rate requirements than audio applications and text applications.

To learn the usage characteristics of various applications that are commonly used by mobile devices, UE 810 and other UE devices determine signal information for the cell sites of a RAN, as well as application information (e.g., application types, typical usage time, etc.). However, in some embodiments, the application information may be determined by performing DPI (e.g., via core and NRT RIC 840). To facilitate this understanding, gNBs 820 of the RAN send traffic and load information to a data lake 850. The traffic and load information helps the network to determine how best to provide the slice(s) to serve the application(s) that users are using. The data lake also stores what data rates are guaranteed to users based on their policies.

NRT RIC 840 retrieves the signal and application information, load information, user policy information, carrier spectrum information, etc., and uses this information to train AI/ML models. For instance, once trained, the AI/ML model may determine that a certain game is being used (e.g., using the App ID, DPI, IP addresses, ports, etc.). The AI/ML models that are used to make decisions quickly for the RAN are deployed to an RT RIC 830 via an A1 interface between RT RIC 830 and NRT RIC 840.

An xApp of RT RIC 830 is configured to use these AI/ML model(s) to perform predictive slice management. More specifically, the xApp uses the AI/ML models to monitor the RAN, which sends network traffic information (and potentially signal information from mobile devices in the RAN) to RT RIC 830 via E2 interfaces. The xApp may thus determine applications that various mobile devices are using in the network. The trained AI/ML model(s) used by the xApp may recommend what bandwidth to allocate for UE 810 and for how long. In other words, certain slice(s) are allocated on the fly for a certain period of time.

The xApp sends control information to the appropriate gNB(s) 820 via the respective E2 interface(s) instructing gNB(s) 820 configure the slice(s) appropriately for UE 810 based on the application(s) that the user is using. This may include assigning bit rates, assigning one or more bands, assigning one or more cell sites, setting up CA, etc. for UE 810, moving one or more other users to a different cell site and/or frequency band, reducing data rate(s) of one or more other users if the user of UE 810 has a high quality subscription, etc. The slices could provide guaranteed downlink throughput, uplink throughput, latency, etc. in accordance with the policy of the user of UE 810. UE 810 and respective gNB(s) 820 then use these slice(s) for communications to and from UE 810. The network continues collection of the signal and application information and the traffic and load information, and the AI/ML models are retrained and/or new AI/ML models are trained using the newly collected data as well.

Figure 8B:
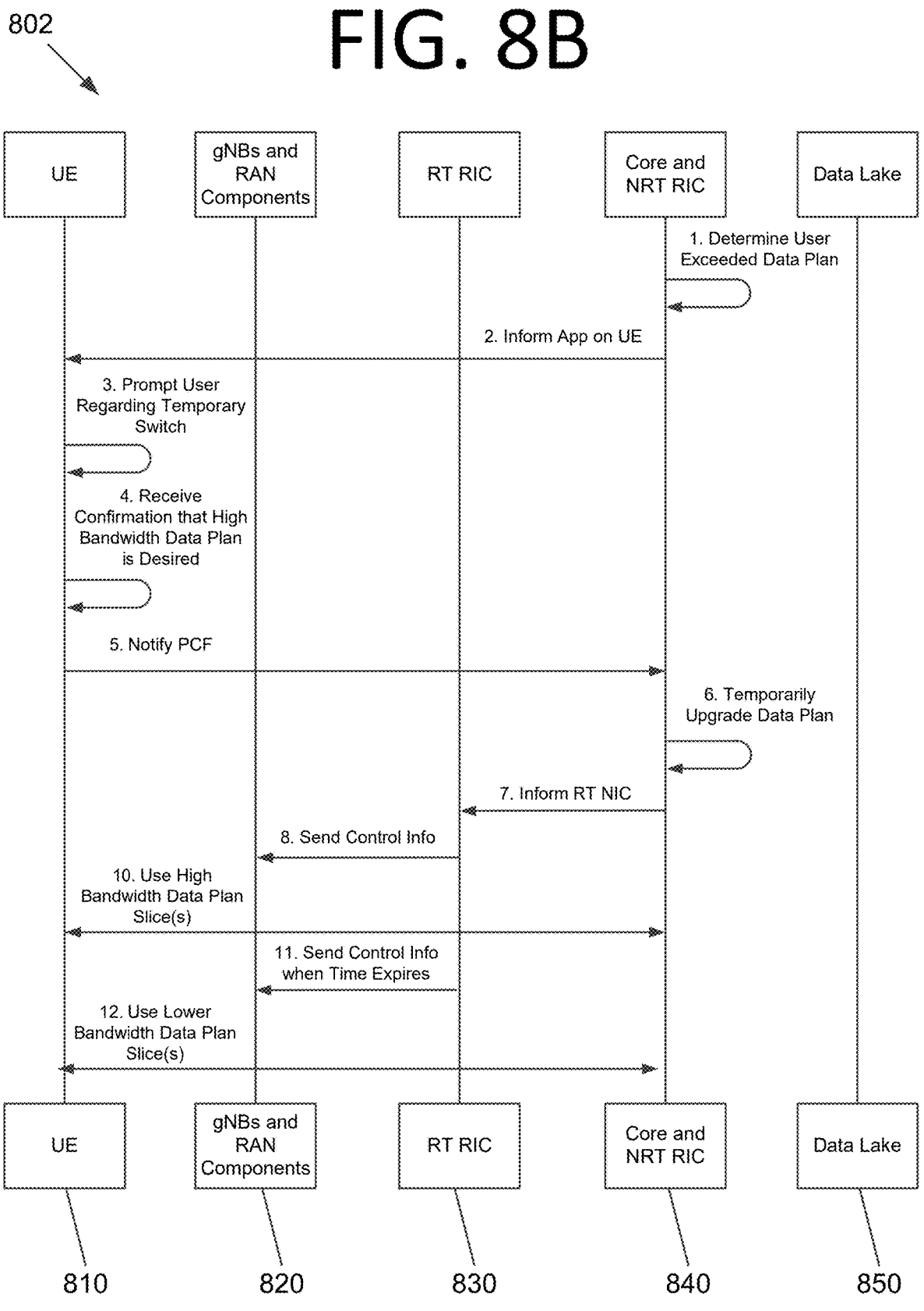
FIG. 8B is a flow diagram illustrating a process for allocating high bandwidth for a period of time when data usage exceeds a user's plan, according to an embodiment of the present invention.

FIG. 8B is a flow diagram illustrating a process 802 for allocating high bandwidth for a period of time when data usage exceeds a user's plan, according to an embodiment of the present invention. RT RIC 840 or another application of the core determines that a user of UE 810 has exceeded his or her data plan. The RT RIC 840 or other core application then informs a carrier application running on UE 810 that he or she has exceeded the data plan, and the application prompts the user of UE 810 regarding whether he or she would like to switch to a higher bandwidth data plan for a period of time for an additional fee. The period of time may be customizable by the user via the application in some embodiments.

The application receives a confirmation from the user that the higher bandwidth data plan is desired and notifies a PCF of core 840 (e.g., the UPF to the SMF to the PCF). Core 840 temporarily upgrades the data plan for the user (e.g., from a regular user profile to a gamer profile) and informs RT RIC 830. An xApp of RT RIC 830 then sends control information to the appropriate gNB(s) 820 via the respective E2 interface (s) instructing gNB(s) 820 configure the slice(s) appropriately for UE 810 based on the higher bandwidth data plan. This may include assigning bit rates, assigning one or more bands, assigning one or more cell sites, setting up CA, etc. for UE 810, moving one or more other users to a different cell site and/or frequency band, reducing data rate(s) of one or more other users if the user of UE 810 has a high quality subscription, etc. The slices could provide guaranteed downlink throughput, uplink throughput, latency, etc. in accordance with the upgraded policy of the user of UE 810. UE 810 and respective gNB(s) 820 then use these slice(s) for communications to and from UE 810.

When the time period for the higher bandwidth data plan expires, the xApp of RT RIC 830 sends control information to the appropriate gNB(s) 820 via the respective E2 interface (s) instructing gNB(s) 820 configure the slice(s) in accordance with the user's original subscription. UE 810 and respective gNB(s) 820 then use these slice(s) for communications to and from UE 810 at a lower bandwidth. The application may allow the user of UE 810 to switch to the higher bandwidth data plan again any time that he or she would like to do so and pay the additional fee.

Figure 9A:
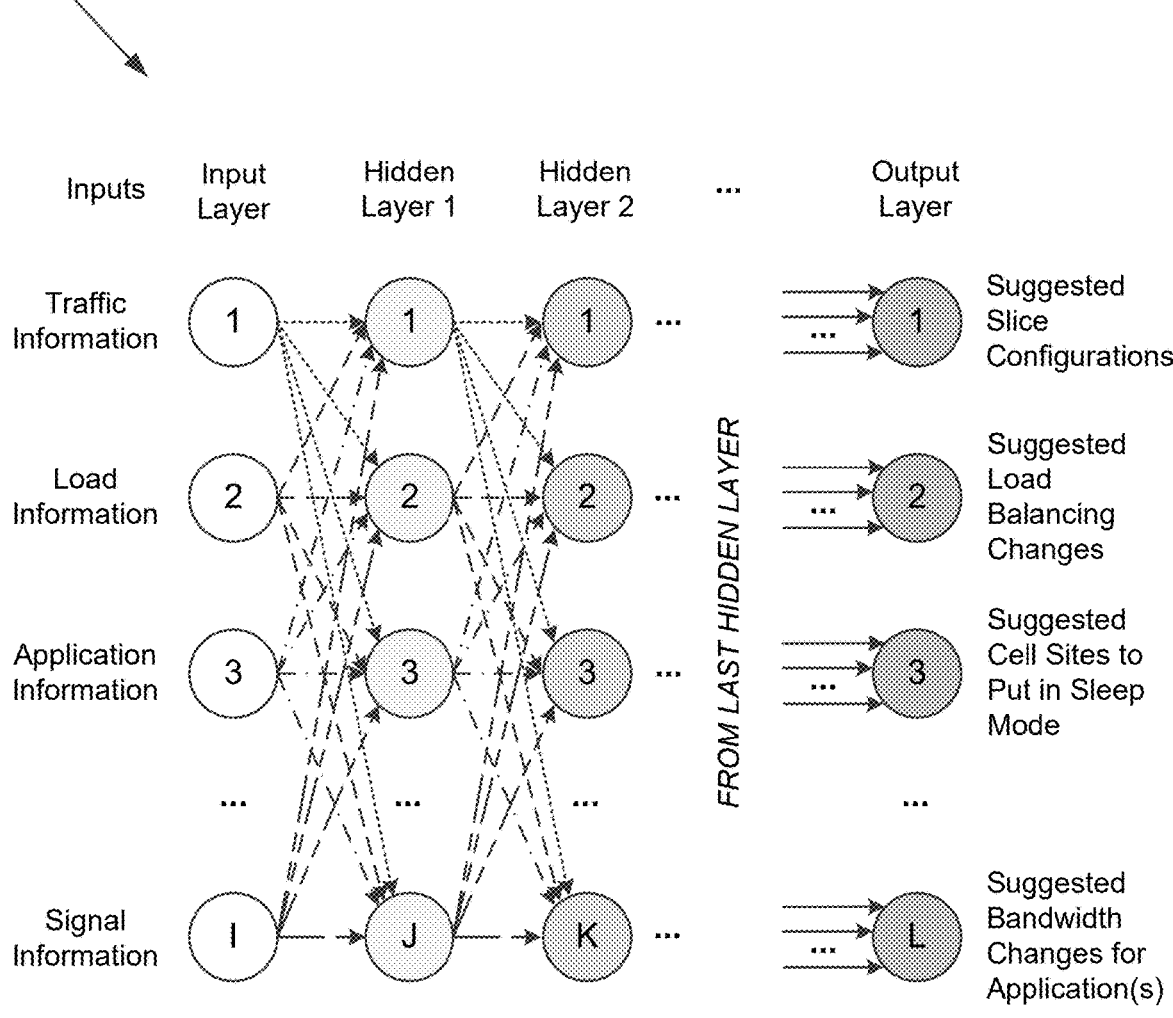
FIG. 9A illustrates an example of a neural network that has been trained to assist with performing traffic balancing for moving users, proactive slice management, and predictive slice management using AI, according to an embodiment of the present invention.

Per the above, AI/ML may be used in some embodiments. Various types of AI/ML models may be trained and deployed without deviating from the scope of the invention. For instance, FIG. 9A illustrates an example of a neural network 900 that has been trained to assist with performing traffic balancing for moving users, proactive slice management, and predictive slice management using AI, according to an embodiment of the present invention.

Neural network 900 includes a number of hidden layers. Both deep learning neural networks (DLNNs) and shallow learning neural networks (SLNNs) usually have multiple layers, although SLNNs may only have one or two layers in some cases, and normally fewer than DLNNs. Typically, the neural network architecture includes an input layer, multiple intermediate layers, and an output layer, as is the case in neural network 900.

A DLNN often has many layers (e.g., 10, 50, 200, etc.) and subsequent layers typically reuse features from previous layers to compute more complex, general functions. A SLNN, on the other hand, tends to have only a few layers and train relatively quickly since expert features are created from raw data samples in advance. However, feature extraction is laborious. DLNNs, on the other hand, usually do not require expert features, but tend to take longer to train and have more layers.

For both approaches, the layers are trained simultaneously on the training set, normally checking for overfitting on an isolated cross-validation set. Both techniques can yield excellent results, and there is considerable enthusiasm for both approaches. The optimal size, shape, and quantity of individual layers varies depending on the problem that is addressed by the respective neural network.

Returning to FIG. 9A, traffic information, load information, application information, signal information, etc. provided as the input layer are fed as inputs to the J neurons of hidden layer 1. Various information may be included in this context, such as bit rates for various applications, typical application usage times, congestion information, latency, SNR, SINR, jitter, numbers of dropped packets, spectrum information (e.g., bands provided by the various cell sites), power usage information for cell sites at various loads, App IDs, IP addresses and ports used by applications, etc. While all of these inputs are fed to each neuron in this example, various architectures are possible that may be used individually or in combination including, but not limited to, feed forward networks, radial basis networks, deep feed forward networks, deep convolutional inverse graphics networks, convolutional neural networks, recurrent neural networks, artificial neural networks, long/short term memory networks, gated recurrent unit networks, generative adversarial networks, liquid state machines, auto encoders, variational auto encoders, denoising auto encoders, sparse auto encoders, extreme learning machines, echo state networks, Markov chains, Hopfield networks, Boltzmann machines, restricted Boltzmann machines, deep residual networks, Kohonen networks, deep belief networks, deep convolutional networks, support vector machines, neural Turing machines, or any other suitable type or combination of neural networks without deviating from the scope of the invention.

Hidden layer 2 receives inputs from hidden layer 1, hidden layer 3 receives inputs from hidden layer 2, and so on for all hidden layers until the last hidden layer provides its outputs as inputs for the output layer. In this example, the outputs may be suggested slice configuration changes, suggested load balancing changes, suggested cell sites to put into sleep mode, suggested bandwidth changes based on application(s) that a user is using, etc. It should be noted that numbers of neurons I, J, K, and L are not necessarily equal, and thus, any desired number of layers may be used for a given layer of neural network 900 without deviating from the scope of the invention. Indeed, in certain embodiments, the types of neurons in a given layer may not all be the same. For instance, convolutional neurons, recurrent neurons, and/or transformer neurons may be used.

Neural network 900 is trained to assign a confidence score to appropriate outputs. In order to reduce predictions that are inaccurate, only those results with a confidence score that meets or exceeds a confidence threshold may be provided in some embodiments. For instance, if the confidence threshold is 80%, outputs with confidence scores exceeding this amount may be used and the rest may be ignored.

It should be noted that neural networks are probabilistic constructs that typically have confidence score(s). This may be a score learned by the AI/ML model based on how often a similar input was correctly identified during training. Some common types of confidence scores include a decimal number between 0 and 1 (which can be interpreted as a confidence percentage as well), a number between negative $\infty$ and positive $\infty$, a set of expressions (e.g., "low," "medium," and "high"), etc. Various post-processing calibration techniques may also be employed in an attempt to obtain a more accurate confidence score, such as temperature scaling, batch normalization, weight decay, negative log likelihood (NLL), etc.

"Neurons" in a neural network are implemented algorithmically as mathematical functions that are typically based on the functioning of a biological neuron. Neurons receive weighted input and have a summation and an activation function that governs whether they pass output to the next layer. This activation function may be a nonlinear thresholded activity function where nothing happens if the value is below a threshold, but then the function linearly responds above the threshold (i.e., a rectified linear unit (ReLU) nonlinearity). Summation functions and ReLU functions are used in deep learning since real neurons can have approximately similar activity functions. Via linear transforms, information can be subtracted, added, etc. In essence, neurons act as gating functions that pass output to the next layer as governed by their underlying mathematical function. In some embodiments, different functions may be used for at least some neurons.

Figure 9B:
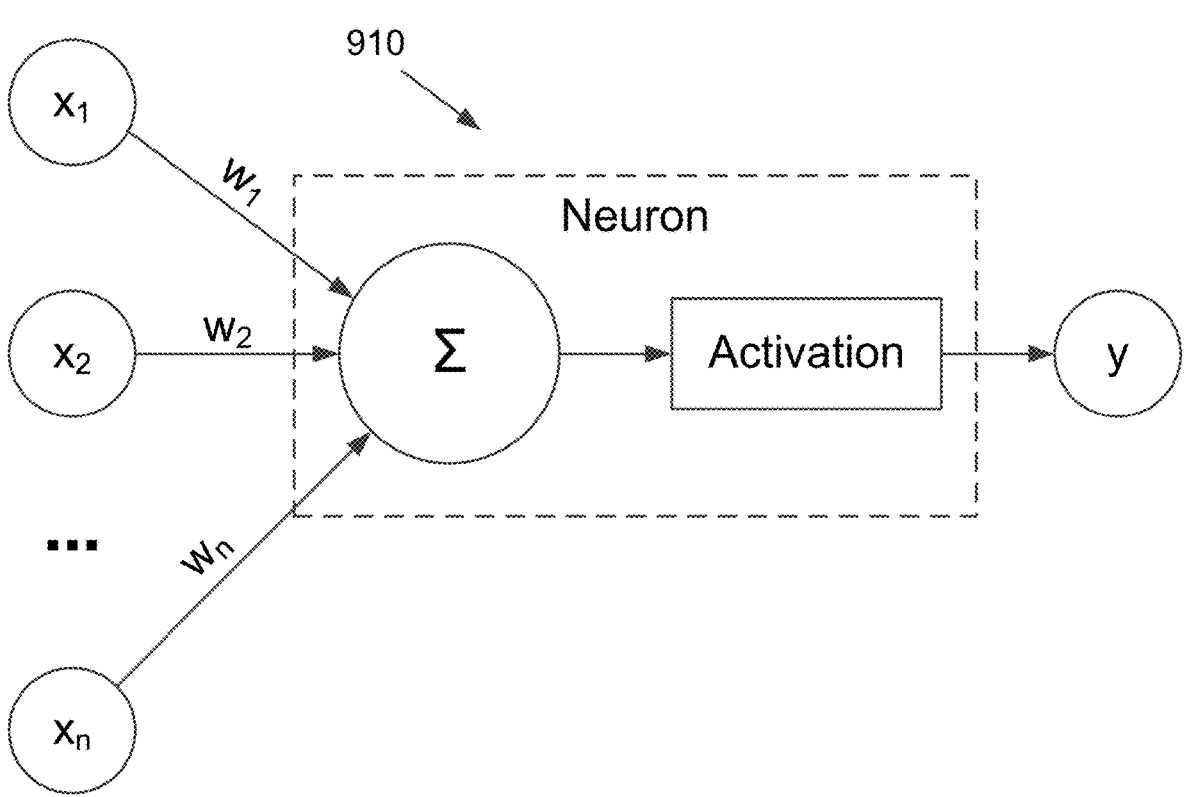
FIG. 9B illustrates an example of a neuron, according to an embodiment of the present invention.

An example of a neuron 910 is shown in FIG. 9B. Inputs $x_1$, $x_2$, . . . , Xn from a preceding layer are assigned respective weights $w_1$, $w_2$, . . . , $w_n$. Thus, the collective input from preceding neuron 1 is $w_1 x_1$. These weighted inputs are used for the neuron's summation function modified by a bias, such as:

$$\sum_{i=1}^{m}(w_i x_i) + \text{bias} \tag{1}$$

This summation is compared against an activation function $f(x)$ to determine whether the neuron "fires". For instance, $f(x)$ may be given by:

$$f(x) = \begin{cases} 1 \text{ if } \sum wx + \text{bias} \geq 0 \\ 0 \text{ if } \sum wx + \text{bias} < 0 \end{cases} \tag{2}$$

The output y of neuron 910 may thus be given by:

$$y = f(x) \sum_{i=1}^{m}(w_i x_i) + \text{bias} \tag{3}$$

In this case, neuron 910 is a single-layer perceptron. However, any suitable neuron type or combination of neuron types may be used without deviating from the scope of the invention. It should also be noted that the ranges of values of the weights and/or the output value(s) of the activation function may differ in some embodiments without deviating from the scope of the invention.

A goal, or "reward function," is often employed. A reward function explores intermediate transitions and steps with both short-term and long-term rewards to guide the search of a state space and attempt to achieve a goal (e.g., finding the best core for a give service or application, determining when a network associated with a core is likely to be congested, etc.).

During training, various labeled data is fed through neural network 900. Successful identifications strengthen weights for inputs to neurons, whereas unsuccessful identifications weaken them. A cost function, such as mean square error (MSE) or gradient descent may be used to punish predictions that are slightly wrong much less than predictions that are very wrong. If the performance of the AI/ML model is not improving after a certain number of training iterations, a data scientist may modify the reward function, provide corrections of incorrect predictions, etc.

Backpropagation is a technique for optimizing synaptic weights in a feedforward neural network. Backpropagation may be used to "pop the hood" on the hidden layers of the neural network to see how much of the loss every node is responsible for, and subsequently updating the weights in such a way that minimizes the loss by giving the nodes with higher error rates lower weights, and vice versa. In other words, backpropagation allows data scientists to repeatedly adjust the weights so as to minimize the difference between actual output and desired output.

The backpropagation algorithm is mathematically founded in optimization theory. In supervised learning, training data with a known output is passed through the neural network and error is computed with a cost function from known target output, which gives the error for backpropagation. Error is computed at the output, and this error is transformed into corrections for network weights that will minimize the error.

In the case of supervised learning, an example of backpropagation is provided below. A column vector input x is processed through a series of N nonlinear activity functions $f_i$ between each layer i=1, . . . , N of the network, with the output at a given layer first multiplied by a synaptic matrix $W_i$, and with a bias vector $b_i$ added. The network output o, given by $$o = f_N(W_N f_{N-1}(W_{N-1} f_{N-2}(\ldots f_1(W_1 x + b_1) \ldots) + b_{N-1}) + b_N) \qquad (4)$$

In some embodiments, o is compared with a target output t, resulting in an error $$E = \frac{1}{2}\|o - t\|^2,$$

which is desired to be minimized.

Optimization in the form of a gradient descent procedure may be used to minimize the error by modifying the synaptic weights $W_i$ for each layer. The gradient descent procedure requires the computation of the output o given an input x corresponding to a known target output t, and producing an error o-t. This global error is then propagated backwards giving local errors for weight updates with computations similar to, but not exactly the same as, those used for forward propagation. In particular, the backpropagation step typically requires an activity function of the form $p_j(n_j)=f'_j(n_j)$, where $n_j$ is the network activity at layer j (i.e., $n_j=W_j o_{j-1}+b_j$) where $o_j=f_j(n_j)$ and the apostrophe 'denotes the derivative of the activity function $f$.

The weight updates may be computed via the formulae:

$$d_j = \begin{cases} (o-t) \circ p_j(n_j), & j = N \\ W_{j+1}^T d_{j+1} \circ p_j(n_j), & j < N \end{cases} \qquad (5)$$

$$\frac{\partial E}{\partial W_{j+1}} = d_{j+1}(o_j)^T \qquad (6)$$

$$\frac{\partial E}{\partial b_{j+1}} = d_{j+1} \qquad (7)$$

$$W_j^{new} = W_j^{old} - \eta \frac{\partial E}{\partial W_j} \qquad (8)$$

$$b_j^{new} = b_j^{old} - \eta \frac{\partial E}{\partial b_j} \qquad (9)$$

where $\circ$ denotes a Hadamard product (i.e., the element-wise product of two vectors), $^T$ denotes the matrix transpose, and $o_j$ denotes $f_j(W_j o_{j-1}+b_j)$, with $o_0=x$. Here, the learning rate $\eta$ is chosen with respect to machine learning considerations. Below, $\eta$ is related to the neural Hebbian learning mechanism used in the neural implementation. Note that the synapses W and b can be combined into one large synaptic matrix, where it is assumed that the input vector has appended ones, and extra columns representing the b synapses are subsumed to W.

The AI/ML model may be trained over multiple epochs until it reaches a good level of accuracy (e.g., 97% or better using an F2 or F4 threshold for detection and approximately 2,000 epochs). This accuracy level may be determined in some embodiments using an F1 score, an F2 score, an F4 score, or any other suitable technique without deviating from the scope of the invention. Once trained on the training data, the AI/ML model may be tested on a set of evaluation data that the AI/ML model has not encountered before. This helps to ensure that the AI/ML model is not "over fit" such that it performs well on the training data, but does not perform well on other data.

In some embodiments, it may not be known what accuracy level is possible for the AI/ML model to achieve. Accordingly, if the accuracy of the AI/ML model is starting to drop when analyzing the evaluation data (i.e., the model is performing well on the training data, but is starting to perform less well on the evaluation data), the AI/ML model may go through more epochs of training on the training data (and/or new training data). In some embodiments, the AI/ML model is only deployed if the accuracy reaches a certain level or if the accuracy of the trained AI/ML model is superior to an existing deployed AI/ML model. In certain embodiments, a collection of trained AI/ML models may be used to accomplish a task. This may collectively allow the AI/ML models to enable semantic understanding to better predict event-based congestion or service interruptions due to an accident, for instance.

Some embodiments may use transformer networks such as SentenceTransformers™, which is a Python™ framework for state-of-the-art sentence, text, and image embeddings. Such transformer networks learn associations of words and phrases that have both high scores and low scores. This trains the AI/ML model to determine what is close to the input and what is not, respectively. Rather than just using pairs of words/phrases, transformer networks may use the field length and field type, as well.

Natural language processing (NLP) techniques such as word2vec, BERT, GPT-3, ChatGPT, etc. may be used in some embodiments to facilitate semantic understanding. Other techniques, such as clustering algorithms, may be used to find similarities between groups of elements. Clustering algorithms may include, but are not limited to, density-based algorithms, distribution-based algorithms, centroid-based algorithms, hierarchy-based algorithms. K-means clustering algorithms, the DBSCAN clustering algorithm, the Gaussian mixture model (GMM) algorithms, the balance iterative reducing and clustering using hierarchies (BIRCH) algorithm, etc. Such techniques may also assist with categorization.

Figure 10:
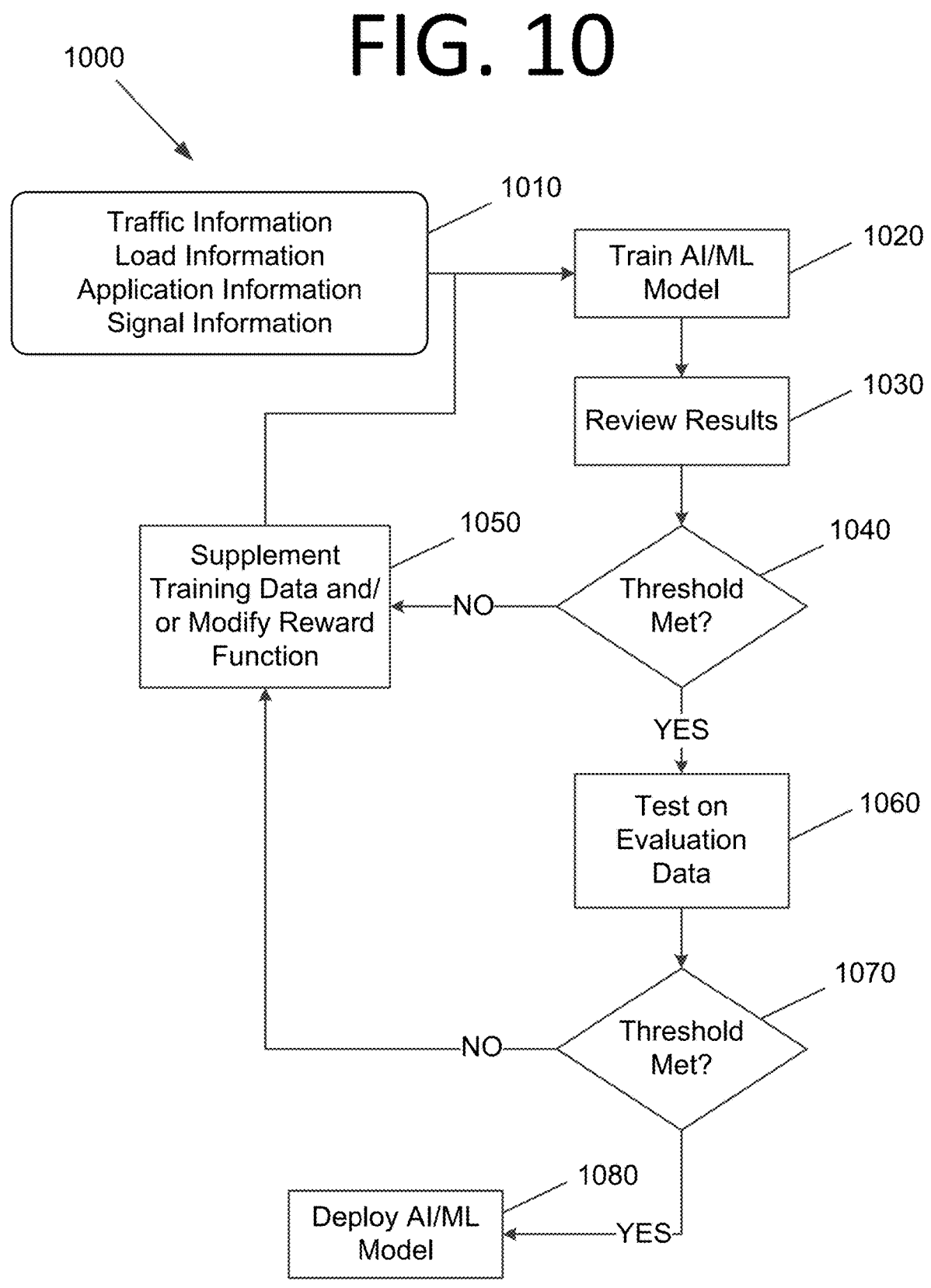
FIG. 10 is a flowchart illustrating a process for training AI/ML model(s), according to an embodiment of the present invention.

FIG. 10 is a flowchart illustrating a process 1000 for training AI/ML model(s), according to an embodiment of the present invention. The process begins with providing traffic information, load information, application information, signal information, etc. at 1010, whether labeled or unlabeled. Other training data used in addition to or in lieu of the training data shown in FIG. 10. Indeed, the nature of the training data that is provided will depend on the objective that the AI/ML model is intended to achieve. The AI/ML model is then trained over multiple epochs at 1020 and results are reviewed at 1030.

If the AI/ML model fails to meet a desired confidence threshold at 1040, the training data is supplemented and/or the reward function is modified to help the AI/ML model achieve its objectives better at 1050 and the process returns to step 1020. If the AI/ML model meets the confidence threshold at 1040, the AI/ML model is tested on evaluation data at 1060 to ensure that the AI/ML model generalizes well and that the AI/ML model is not over fit with respect to the training data. The evaluation data includes information that the AI/ML model has not processed before. If the confidence threshold is met at 1070 for the evaluation data, the AI/ML model is deployed at 1080. If not, the process returns to step 1050 and the AI/ML model is trained further.

Figure 11:
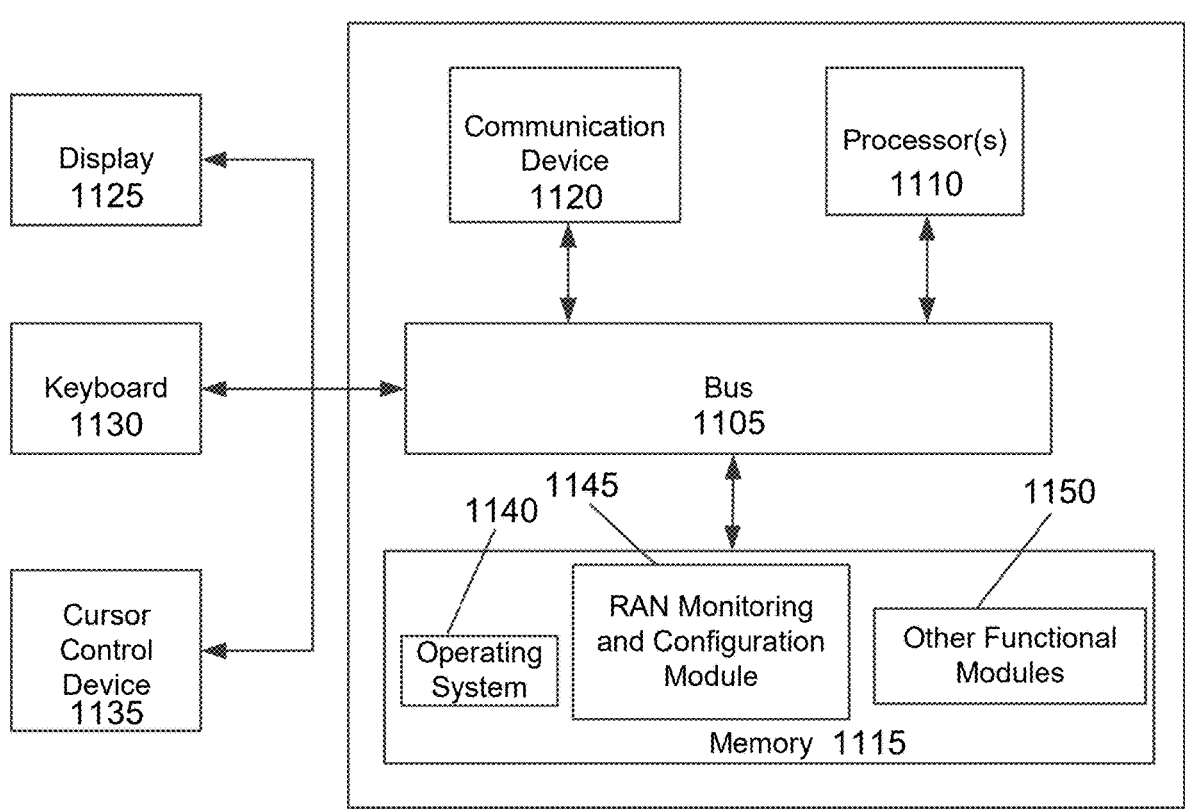
FIG. 11 is an architectural diagram illustrating a computing system configured to perform aspects of traffic balancing for moving users, proactive slice management, and predictive slice management using AI, according to an embodiment of the present invention.

FIG. 11 is an architectural diagram illustrating a computing system 1100 configured to perform aspects of traffic balancing for moving users, proactive slice management, and predictive slice management using AI, according to an embodiment of the present invention. In some embodiments, computing system 1100 may be one or more of the computing systems depicted and/or described herein, such as a mobile device, a tablet, a laptop computer, a smart watch, a carrier network computing system (e.g., a computing system of a RAN, a PEDC, a BEDC, an RDC, or an NDC), a computing system of a data lake, etc. Computing system 1100 includes a bus 1105 or other communication mechanism for communicating information, and processor(s) 1110 coupled to bus 1105 for processing information. Processor (s) 1110 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1110 may also have multiple processing cores, and at least some of the cores may be configured to perform specific functions. Multi-parallel processing may be used in some embodiments. In certain embodiments, at least one of processor(s) 1110 may be a neuromorphic circuit that includes processing elements that mimic biological neurons. In some embodiments, neuromorphic circuits may not require the typical components of a Von Neumann computing architecture.

Computing system 1100 further includes a memory 1115 for storing information and instructions to be executed by processor(s) 1110. Memory 1115 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 1110 and may include volatile media, non-volatile media, or both. The media may also be removable, non-removable, or both.

Additionally, computing system 1100 includes a communication device 1120, such as a transceiver, to provide access to a communications network via a wireless and/or wired connection. In some embodiments, communication device 1120 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), 5G, New Radio (NR), any combination thereof, and/or any other currently existing or future-implemented communications standard and/or protocol without deviating from the scope of the invention. In some embodiments, communication device 1120 may include one or more antennas that are singular, arrayed, phased, switched, beamforming, beamsteering, a combination thereof, and or any other antenna configuration without deviating from the scope of the invention.

Processor(s) 1110 are further coupled via bus 1105 to a display 1125, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 1125 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 1130 and a cursor control device 1135, such as a computer mouse, a touchpad, etc., are further coupled to bus 1105 to enable a user to interface with computing system 1100. However, in certain embodiments, a physical keyboard and mouse may not be present, and the user may interact with the device solely through display 1125 and/or a touchpad (not shown). Any type and combination of input devices may be used as a matter of design choice. In certain embodiments, no physical input device and/or display is present. For instance, the user may interact with computing system 1100 remotely via another computing system in communication therewith, or computing system 1100 may operate autonomously.

Memory 1115 stores software modules that provide functionality when executed by processor(s) 1110. The modules include an operating system 1140 for computing system 1100. The modules further include a RAN monitoring and configuration module 1145 that is configured to perform all or part of the processes described herein or derivatives thereof. Computing system 1100 may include one or more additional functional modules 1150 that include additional functionality.

One skilled in the art will appreciate that a "computing system" could be embodied as a server, an embedded computing system, a personal computer, a console, a cell phone, a tablet computing device, a smart watch, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 12:
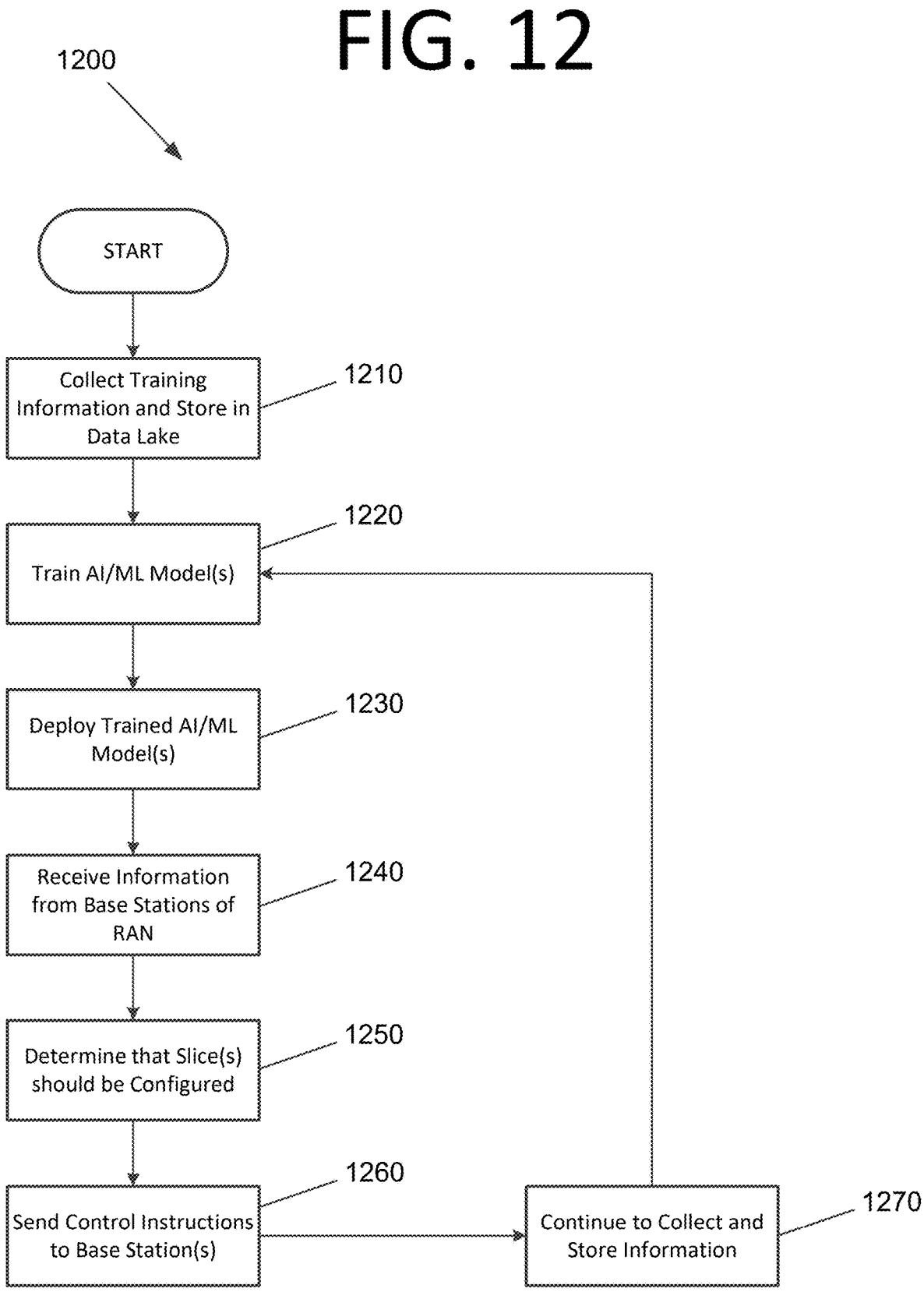
FIG. 12 is a flowchart illustrating a process for adjusting RANs based on predicted data usage for moving users based on the needs of the application(s) they are running, according to an embodiment of the present invention.

FIG. 12 is a flowchart illustrating a process 1200 for adjusting RANs based on predicted data usage for moving users based on the needs of the application(s) they are running, according to an embodiment of the present invention. The process begins with collecting and storing traffic information, user profile information, signal information, and spectrum information for the RAN in a data lake at 1210. AI/ML model(s) are trained using the stored traffic information, user profile information, signal information, and spectrum information from the data lake by an NRT RIC or another application of a network core at 1220. The trained AI/ML model(s) are deployed at 1230 to the RT RIC, by the NRT RIC, via an A1 interface.

The NT RIC receives traffic information from base stations of the RAN at 1240. In some embodiments, signal information is also received from a plurality of mobile devices that use the RAN. The NT RIC, which calls and uses the AI/ML model(s) to process the traffic information (and potentially the signal information), determines that one or more network slices for a mobile device should be configured at 1250. The NT RIC then sends control instructions to at least one of the base stations via an E2 interface to configure the one or more network slices for the mobile device. In some embodiments, steps 1240, 1250, and 1260 are performed by an xApp of the RT RIC.

The network continues to collect and store the traffic information and user profile information, signal information, and spectrum information for the RAN in the data lake at 1270. When a predetermined amount of time has elapsed, after a predetermined amount of data is collected, at the command of a network engineer, etc., the process returns to step 1220. Specifically, the AI/ML model(s) are retrained and/or new AI/ML model(s) are trained using the stored traffic information, user profile information, signal information, and spectrum information from the data lake by the NRT RIC or the other application of the network core. The retrained and/or new models are then deployed at 1230 and the process repeats.

In some embodiments, the control instructions are based on a profile of a user of the mobile device and expected data usage for the profile. In certain embodiments, the one or more network slices are configured to provide an amount of data that the RT RIC anticipates one or more applications running on the mobile device will use. In some embodiments, the configuring of the one or more network slices includes assigning bit rates, assigning one or more bands, assigning one or more cell sites, setting up CA, or any combination thereof, for the mobile device. In certain embodiments, the one or more network slices provide guaranteed downlink throughput, guaranteed uplink throughput, guaranteed maximum latency, or any combination thereof.

Figure 13:
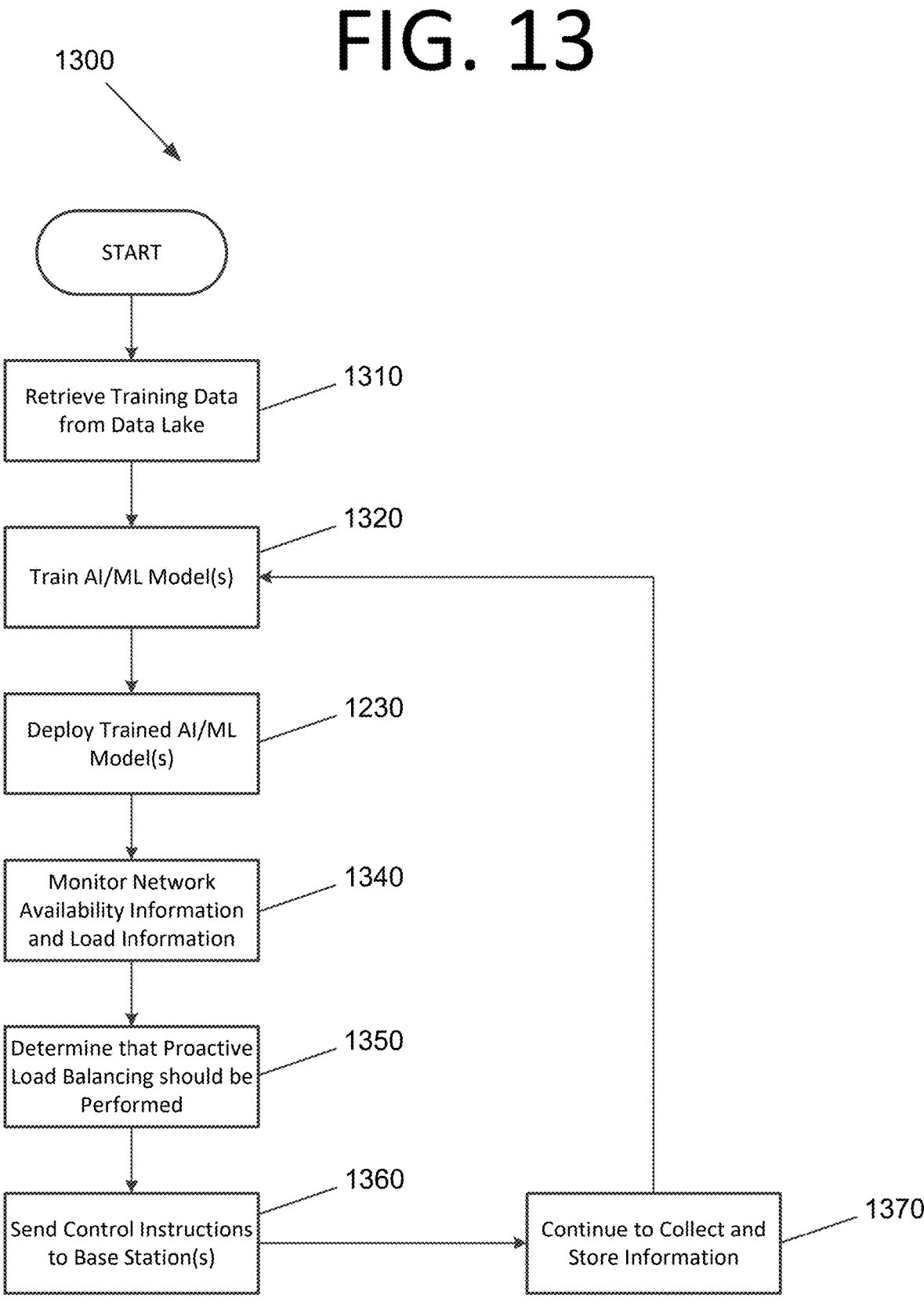
FIG. 13 is a flowchart illustrating a process for performing load balancing when new users move into a coverage area, according to an embodiment of the present invention.

FIG. 13 is a flowchart illustrating a process 1300 for performing load balancing when new users move into a coverage area, according to an embodiment of the present invention. The process begins with retrieving, by an NRT RIC, the signal information, load information, user policy information, and carrier spectrum information from a data lake at 1310. The NRT RIC trains one or more AI/ML models using the information from the data lake at 1320 and deploys the one or more trained AI/ML models to an RT RIC at 1330.

The NT RIC monitors network availability information and load information from a RAN at 1340. The NT RIC determines using the trained AI/ML model(s) that proactive load balancing should be performed for the RAN at 1350. The determining that the proactive load balancing should be performed can includes at least one of determining overall RAN usage, individual cell site loads, and power consumption. Responsive to this determination, the RT RIC sends control instructions to one or more base stations of the RAN to perform the proactive load balancing at 1360. The RT RIC may continue to collect information from the RAN and/or its UE devices and store this information in the data lake at 1370 so retraining can periodically be performed at 1320.

In some embodiments, the proactive load balancing is performed responsive to a UE device moving into a different coverage area of the RAN. In certain embodiments, the predictive load balancing is performed responsive to a predetermined number of UE devices moving into a coverage area of the RAN. In some embodiments, the proactive load balancing includes moving one or more UE devices to one or more cell sites based on current load conditions of the RAN. In certain embodiments, the proactive load balancing includes moving one or more UE devices to one or more cell sites to reduce power consumption in the RAN.

Figure 14:
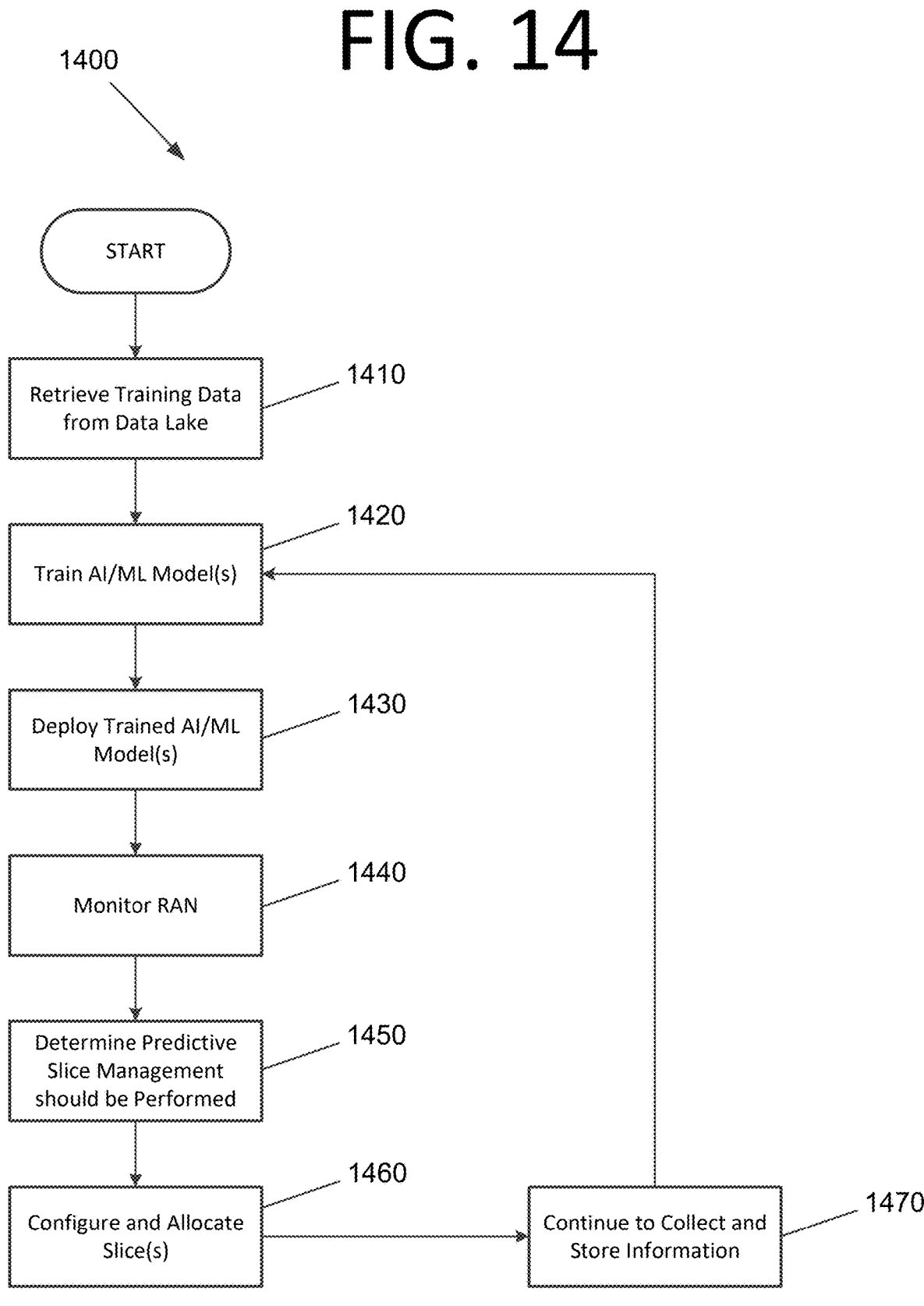
FIG. 14 is a flowchart illustrating a process for performing predictive slice management to allocate bandwidth to users for a period of time based on predicted application usage, according to an embodiment of the present invention.

FIG. 14 is a flowchart illustrating a process 1400 for performing predictive slice management to allocate bandwidth to users for a period of time based on predicted application usage, according to an embodiment of the present invention. The process begins with an NRT RIC retrieving signal information, traffic information, network load information, user policy information, and carrier spectrum information from a data lake at 1410. The NRT RIC then trains one or more AI/ML models using the information retrieved from the data lake at 1420 and deploys the trained AI/ML model(s) to an RT RIC at 1430.

The RT RIC monitors a RAN using the trained AI/ML model(s) at 1440. The RT RIC determines using the AI/ML model(s) that predictive slice management should be performed based on predicted application usage on a UE device at 1450. The NT RIC then configures and allocates one or more slices to the UE device based on the predicted application usage at 1460. The RT RIC may continue to collect information from the RAN and/or its UE devices and store this information in the data lake at 1470 so retraining can periodically be performed at 1420.

In some embodiments, the AI/ML model(s) are configured to determine which application is being used by the UE device based on at least one of an App ID, DPI, one or more IP addresses, and one or more ports. In certain embodiments, the one or more slices are allocated on the fly for a period of time by sending control information to one or more base stations of the RAN. In some embodiments, the allocation of the one or more slices includes at least one of moving one or more other UE devices to a different cell site, moving the one or more other UE devices to a different frequency band, and reducing data rates of the one or more other UE devices when the user of the UE device to be allocated the one or more slices has a higher quality subscription.

The process steps performed in FIGS. 6-8, 10, and 12-14 may be performed by computer program(s), encoding instructions for the processor(s) to perform at least part of the process(es) described in FIGS. 6-8, 10, and 12-14, in accordance with embodiments of the present invention. The computer program(s) may be embodied on non-transitory computer-readable media. The computer-readable media may be, but are not limited to, a hard disk drive, a flash device, RAM, a tape, and/or any other such medium or combination of media used to store data. The computer program(s) may include encoded instructions for controlling processor(s) of computing system(s) (e.g., processor(s) 1110 of computing system 1100 of FIG. 11) to implement all or part of the process steps described in FIGS. 6-8, 10, and 12-14, which may also be stored on the computer-readable medium.

The computer program(s) can be implemented in hardware, software, or a hybrid implementation. The computer program(s) can be composed of modules that are in operative communication with one another, and which are designed to pass information or instructions to display. The computer program(s) can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. One or more computing systems, comprising:
   memory storing computer program instructions; and
   at least one processor configured to execute the computer program instructions, wherein the computer program instructions are configured to cause the at least one processor to:
      receive traffic information from one or more base stations of a Radio Access Network (RAN),
      determine, by a near-real time RAN Intelligent Controller (RT RIC) that uses one or more Artificial Intelligence (AI)/Machine Learning (ML) models, based on the received traffic information that one or more network slices for a mobile device should be configured,
      send, by the RT RIC, control instructions to at least one base station of the one or more base stations to configure the one or more network slices for the mobile device;
      store the traffic information, user profile information, signal information, and spectrum information for the RAN in a data lake;
      train, by a non-real time (NRT) RIC or another application of a network core, the one or more AI/ML models using the stored traffic information, the user profile information, the signal information, and the spectrum information from the data lake; and deploy, by the NRT RIC, the one or more trained AI/MVL models to the RT RIC via an AI interface.

2. The one or more computing systems of claim 1, wherein the computer program instructions are further configured to cause the at least one processor to:

receive, by the RT RIC, respective signal information from a plurality of mobile devices that use the RAN; and use, by the RT RIC and the trained one or more AI/ML models, the received respective signal information in addition to the received traffic information for determining that the that one or more network slices for a mobile device should be configured.

3. The one or more computing systems of claim 1, wherein the receiving of the traffic information, the determining that the one or more network slices for the mobile device should be modified, and the sending of the control instructions are performed by an xApp of the RT RIC.

4. The one or more computing systems of claim 1, wherein the control instructions are based on a profile of a user of the mobile device and expected data usage for the profile.

5. The one or more computing systems of claim 1, wherein the one or more network slices are configured to provide an amount of data that the RT RIC anticipates one or more applications running on the mobile device will use.

6. The one or more computing systems of claim 1, wherein the configuring of the one or more network slices comprises at least one of assigning bit rates, assigning one or more bands, assigning one or more cell sites, and setting up Carrier Aggregation (CA) for the mobile device.

7. The one or more computing systems of claim 1, wherein the one or more network slices provide at least one of guaranteed downlink throughput, guaranteed uplink throughput, and guaranteed maximum latency.

8. The one or more computing systems of claim 1, wherein the RIC is a near-real time (NT) RIC in the RAN and the computer program instructions are further configured to cause the at least one processor to:

continue to collect and store the received traffic information, user profile information, signal information, and spectrum information for the RAN in the data lake;

retrain, by the non-real time (NRT) RIC or another application of the network core, the one or more AI/IL models and/or train one or more new AI/ML models using the stored received traffic information, the user profile information, the signal information, and the spectrum information from the data lake; and deploy, by the NRT RIC, the one or more trained AI/NL models and/or the one or more trained new AI/NL models to the RT RIC via the AI interface.

9. A computer-implemented method, comprising:

monitoring, by a near-real time Radio Access Network (RAN) Intelligent Controller (RT RIC), network availability information and load information from a RAN;

determining, by the RT RIC using one or more Artificial Intelligence (AI)/Machine Learning (ML) models, that proactive load balancing should be performed for the RAN upon one or more User Equipment (UE) devices entering a coverage area; and sending, by the RIC, control instructions to one or more base stations of the RAN to perform the proactive load balancing; and storing the traffic information, user profile information, signal information, and spectrum information for the RAN in a data lake;

training, by a non-real time (NRT) RIC or another application of a network core, the one or more AI/NL models using the stored traffic information, the user profile information, the signal information, and the spectrum information from the data lake; and deploying, by the NRT RIC, the one or more trained AI/ML models to the RT RIC via an AI interface.

10. The computer-implemented method of claim 9, the method further comprises:

retrieving, by the non-real time (NRT) RIC, the signal information, the load information, the user profile information, and the spectrum information from the data lake;

training, by the NRT RIC, the one or more AI/MVL models using the signal information, the load information, the user profile information, and the spectrum information from the data lake; and deploying, by the NRT RIC, the one or more trained AI/ML models to the RT RIC.

11. The computer-implemented method of claim 9, wherein the determining that the proactive load balancing should be performed comprises at least one of determining overall RAN usage, individual cell site loads, and power consumption.

12. The computer-implemented method of claim 9, further comprising:

determining, by the RT RIC, that a User Equipment (UE) device of the one or more user devices has moved into a different coverage area in the RAN; and performing, by the RAN, the proactive load balancing responsive to the determination.

13. The computer-implemented method of claim 9, wherein the proactive load balancing is performed responsive to a predetermined number of User Equipment (UE) devices moving into the coverage area of the RAN.

14. The computer-implemented method of claim 9, wherein the proactive load balancing comprises moving one or more User Equipment (UE) devices of the one or more UE devices to one or more cell sites based on current load conditions of the RAN.

15. The computer-implemented method of claim 9, wherein the proactive load balancing comprises moving one or more User Equipment (UE) devices to one or more cell sites to reduce power consumption in the RAN.

16. One or more computing systems, comprising:

memory storing computer program instructions; and at least one processor configured to execute the stored computer program instructions, wherein the computer program instructions are configured to cause the at least one processor to:

monitor, by a near-real time Radio Access Network (RAN) Intelligent Controller (RT RIC), a RAN using one or more Artificial Intelligence (AI)/Machine Learning (ML) models, determine, by the RT RIC using the one or more AI/ML models, that predictive slice management should be performed based on predicted application usage on a User Equipment (UE) device, configure and allocate, by the RT RIC, one or more network slices to the UE device based on the predicted application usage;

retrieve, by a non-real time (NRT) RIC, signal information, traffic information, network load information, user profile information, and spectrum information from a data lake;

train, by the NRT RIC, the one or more AI/ML models 5 using the signal information, the traffic information, the network load information, the user profile information, and the spectrum information retrieved from the data lake; and deploy, by the NRT RIC, the trained one or more 10 AI/ML models to the RT RIC.

17. The one or more computing systems of claim 16, wherein the trained one or more AI/ML models are configured to determine which application is being used by the UE device based on at least one of an application identifier (App 15 ID), Deep Packet Inspection (DPI), one or more Internet Protocol (IP) addresses, and one or more ports.

18. The one or more computing systems of claim 16, wherein the one or more network slices are allocated on the fly for 20 a period of time by sending control information to one or more base stations of the RAN, and the allocation of the one or more network slices comprises at least one of moving one or more other UE devices to a different cell site, moving the one or more other UE 25 devices to a different frequency band, and reducing data rates of the one or more other UE devices when a user of the UE device to be allocated to the one or more network slices has a higher quality subscription.

\* \* \* \* \*

30